(12) United States Patent
Webster et al.

(10) Patent No.: US 8,062,729 B2
(45) Date of Patent: Nov. 22, 2011

(54) POLYMERIC MATERIAL WITH SURFACE MICRODOMAINS

(75) Inventors: Dean C. Webster, Fargo, ND (US); Partha S. Majumdar, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 688 days.

(21) Appl. No.: 11/827,446

(22) Filed: Jul. 11, 2007

(65) Prior Publication Data

US 2010/0323190 A9 Dec. 23, 2010

Related U.S. Application Data

(63) Continuation of application No. PCT/US2006/000166, filed on Jan. 4, 2006.

(60) Provisional application No. 60/644,355, filed on Jan. 14, 2005, provisional application No. 60/691,317, filed on Jun. 16, 2005, provisional application No. 60/743,005, filed on Dec. 2, 2005.

(51) Int. Cl.
*D06N 7/04* (2006.01)

(52) U.S. Cl. ............ 428/141; 428/423.1; 428/447; 528/28; 528/33; 528/60; 528/66

(58) Field of Classification Search ............ 428/141, 428/156, 195.1, 423.1, 447; 528/26, 28, 528/33, 60, 66
See application file for complete search history.

(56) References Cited

U.S. PATENT DOCUMENTS

| | | | |
|---|---|---|---|
| 3,243,475 A | * | 3/1966 | Reischl et al. .................. 528/26 |
| 3,246,048 A | * | 4/1966 | Haluska ........................ 528/27 |
| 3,450,791 A | * | 6/1969 | Gaske et al. .............. 525/440.03 |
| 4,125,491 A | | 11/1978 | Gorman |
| 4,202,807 A | * | 5/1980 | Moretto et al. ............... 524/263 |
| 4,298,543 A | | 11/1981 | Law et al. |
| 4,687,813 A | | 8/1987 | Lenz et al. |
| 4,697,913 A | | 10/1987 | Kuramoto et al. |
| 4,902,767 A | * | 2/1990 | Roitman et al. ................ 528/28 |
| 4,910,252 A | | 3/1990 | Yonehara et al. |
| 4,933,178 A | | 6/1990 | Capelli |
| 5,001,210 A | | 3/1991 | Coury et al. |
| 5,019,096 A | | 5/1991 | Fox, Jr. et al. |
| 5,049,684 A | | 9/1991 | Tomibe et al. |
| 5,203,991 A | | 4/1993 | Kutsuna et al. |
| 5,237,082 A | | 8/1993 | Leir et al. |
| 5,498,644 A | | 3/1996 | Reo |

(Continued)

FOREIGN PATENT DOCUMENTS

CA 2 413 672 A1 8/2003

(Continued)

OTHER PUBLICATIONS

V.M.Starov, N. V. Churaev, Wetting films on locally heterogeneous surfaces: hydrophilic surface with hydrophobic spots, Colloids and Surfaces A: Physicochemical and Engineering Aspects 156 (1999) (no month) 243-248.*

(Continued)

*Primary Examiner* — Gerard Higgins
(74) *Attorney, Agent, or Firm* — Foley & Lardner LLP

(57) ABSTRACT

A polymeric material may be prepared by reacting a composition that includes polyol, polyisocyanate, and polyorganosiloxane having functional groups capable of reacting with the polyisocyanate, wherein the polymeric material has a surface which includes raised microdomains.

35 Claims, 11 Drawing Sheets

U.S. PATENT DOCUMENTS

| | | | |
|---|---|---|---|
| 5,589,563 A | 12/1996 | Ward et al. | |
| 5,641,855 A | 6/1997 | Scherr et al. | |
| 5,750,630 A | 5/1998 | Sengupta | |
| 5,986,018 A | 11/1999 | Yamaguchi et al. | |
| 6,030,632 A | 2/2000 | Sawan et al. | |
| 6,099,897 A | 8/2000 | Sayo et al. | |
| 6,124,427 A | 9/2000 | Arwood | |
| 6,127,507 A | 10/2000 | Santerre | |
| 6,153,724 A | 11/2000 | Hollingsworth | |
| 6,224,579 B1 | 5/2001 | Modak et al. | |
| 6,413,446 B1 | 7/2002 | Mechtel et al. | |
| 6,458,878 B1 | 10/2002 | Tsuboi et al. | |
| 6,482,912 B2 | 11/2002 | Boudjouk et al. | |
| 6,500,549 B1 * | 12/2002 | Deppisch et al. | 428/425.5 |
| 6,521,144 B2 | 2/2003 | Takezawa et al. | |
| 6,524,564 B1 | 2/2003 | Kim et al. | |
| 6,559,201 B2 | 5/2003 | Simendinger, III | |
| 6,716,895 B1 | 4/2004 | Terry | |
| 6,861,493 B2 | 3/2005 | Bauer et al. | |
| 6,924,116 B2 | 8/2005 | Tan et al. | |
| 6,949,598 B2 | 9/2005 | Terry | |
| 7,098,256 B2 | 8/2006 | Ong et al. | |
| 7,141,183 B2 | 11/2006 | Hattori et al. | |
| 7,179,789 B2 | 2/2007 | Patt | |
| 7,204,940 B2 | 4/2007 | McDonald et al. | |
| 7,345,131 B2 | 3/2008 | Selbertinger et al. | |
| 7,378,156 B2 | 5/2008 | Terry | |
| 7,449,537 B2 | 11/2008 | Boudjouk et al. | |
| 7,452,956 B2 | 11/2008 | Cheng et al. | |
| 7,544,722 B2 | 6/2009 | Boudjouk et al. | |
| 2002/0013385 A1 | 1/2002 | Simendinger, III | |
| 2002/0098214 A1 | 7/2002 | Adams et al. | |
| 2002/0156223 A1 | 10/2002 | Boudjouk et al. | |
| 2003/0022793 A1 | 1/2003 | Ring et al. | |
| 2003/0044451 A1 | 3/2003 | McGhee et al. | |
| 2003/0092864 A1 * | 5/2003 | Gunatillake et al. | 528/26 |
| 2003/0129421 A1 | 7/2003 | Terauchi et al. | |
| 2003/0207962 A1 | 11/2003 | Oya et al. | |
| 2003/0236552 A1 | 12/2003 | Roby | |
| 2004/0116551 A1 | 6/2004 | Terry | |
| 2005/0009985 A1 | 1/2005 | Selbertinger et al. | |
| 2005/0080158 A1 | 4/2005 | Ong et al. | |
| 2005/0129962 A1 | 6/2005 | Amidaiji et al. | |
| 2005/0227092 A1 | 10/2005 | Yamaya et al. | |
| 2005/0282997 A1 | 12/2005 | Ward et al. | |
| 2006/0014015 A1 | 1/2006 | Travelute et al. | |
| 2006/0276608 A1 | 12/2006 | Lang et al. | |
| 2007/0021529 A1 | 1/2007 | Boudjouk et al. | |
| 2007/0042199 A1 | 2/2007 | Chisholm et al. | |
| 2007/0048344 A1 | 3/2007 | Yahiaoui et al. | |
| 2007/0093618 A1 | 4/2007 | Cheng et al. | |
| 2007/0129474 A1 | 6/2007 | Salamone et al. | |
| 2007/0132949 A1 | 6/2007 | Phelan | |
| 2008/0112920 A1 | 5/2008 | Chia et al. | |
| 2008/0181862 A1 | 7/2008 | Chisholm et al. | |
| 2008/0199536 A1 | 8/2008 | Terry | |
| 2008/0213599 A1 | 9/2008 | Webster et al. | |
| 2009/0018276 A1 | 1/2009 | Boudjouk et al. | |
| 2009/0111937 A1 | 4/2009 | Webster et al. | |
| 2009/0143496 A1 | 6/2009 | Ziche | |
| 2009/0194733 A1 | 8/2009 | Schulz et al. | |
| 2009/0215762 A1 | 8/2009 | Stafslien et al. | |
| 2010/0004202 A1 | 1/2010 | Chisholm et al. | |

FOREIGN PATENT DOCUMENTS

| | | |
|---|---|---|
| CA | 2 621 000 | 3/2007 |
| EP | 1403300 B1 | 3/2004 |
| EP | 1 496 079 A1 | 1/2005 |
| JP | 2-47371 | 2/1990 |
| WO | WO 2004/044012 | 5/2004 |
| WO | WO 2005/030405 | 4/2005 |
| WO | WO 2005037887 A1 * | 4/2005 |
| WO | PCT/US2006/029035 | 7/2006 |
| WO | WO 2006/086092 A2 | 8/2006 |
| WO | WO 2006/121937 A1 | 11/2006 |
| WO | WO 2007/053163 | 5/2007 |
| WO | WO 2007/108980 A1 | 9/2007 |
| WO | WO 2008/008077 A2 | 1/2008 |
| WO | WO 2009/025924 A2 | 2/2009 |

OTHER PUBLICATIONS

EIC Search Report, U.S. Appl. No. 11/827,446, Jun. 15, 2009.*
Majumdar, et al., Macromolecules, "Preparation of Siloxane . . . " 2005 (no month), p. 5857-9.*
Chen et al. "Ultraviolet Curing Kinetics of Cycloaliphatic Epoxide with Real-time Fourier Transform Infrared Spectroscopy," J. Appl. Poly. Sci. 2003, 90, 2485-2499.*
Majumdar et al., "Influence of solvent composition and degree of reaction on the formation of surface microtopography in a thermoset siloxane-urethane system," Polymer, 2006, 47, p. 4172-4181.*
Supplementary European Search Report and European Search Opinion, 2 pages, Jan. 21, 2008.
Espacenet.com Abstract for EP 1403300, Mar. 31, 2004, 1 page.
Pike et al., "Water-Induced Surface Rearrangements of Poly(dimethylsiloxane-urea-urethane) Segmented Block Copolymers", *Chemistry of Materials*, vol. 8, Nos. 1-6, Apr. 1996 (pp. 856-860).
Abstract for Japanese Publication No. JP 04-370163, "Coating Composition," publication Date Dec. 22, 1992, 1 page.
Abstract for Japanese Publication No. JP 63-277222 A,"Curing Resin," publication Date Nov. 15, 1998, 1 page.
U.S. Appl. No. 60/934,093, filed Jun. 11, 2007, Webster et al.
U.S. Appl. No. 12/378,155, filed Feb. 11, 2009, Chisholm et al.
U.S. Appl. No. 11/810,696, filed Jun. 6, 2007, Webster et al.
Abstract for Japanese Publication No. JP 11-222402, publication Date Aug. 17, 1999, Patentee or Applicant listed as Osaka Gas Co. Ltd., 1 page.
Abstract for Japanese Publication No. JP 2001-029451 (A), "Antibacterial Urethral Catheter and Manufacture of the same," Toyo Boseki et al., publication date Feb. 6, 2001, 1 page.
Abstract for JP 2000-264803, "Silver Microbide-Containing Photopolymerizable Monomer Compositions, and Solventless UV- or Electron Beam-Curable Resin Compositions Containing Them," Takeuchi et al., publication date Sep. 26, 2000, 1 page.
Abstract for JP 2003-327912, "Primer Antifouling Coating Material Composition for Ship, Composite Antifouling Coating Film for Ship, Method for Forming the Composite Antifouling Coating Film, Ship Coated with the Composite Antifouling Coating Film and Antifouling Method for Outer Hull of Ship," Masuda Hiroshi et al., publication date Nov. 19, 2003, 1 page.
Abstract for JP 51-17554, "UV-Curable Antimicrobial Acrylic Coating Materials," Honda et al., publication date May 14, 1993, 1 page.
Abstract for JP 53-139653, "Marine Antifouling Material," Takamizawa Minoru et al., publication date Dec. 6, 1978, 1 page.
Abstract for JP 60-09919, "Crosslinked Urethane Acrylate Polymer Particle-Containing Antimicrobial Coatings," Honda et al., publication date Jan. 18, 1994, 1 page.
Abstract for JP 2007-246576 A, "Water Paint Composition," Matsushita et al., publication date Sep. 27, 2007, 1 page.
Abstract for JP 63-270738, "Polyamine/Polysiloxane Block Copolymer", Tezuka Yasushi et al., publication date Nov. 8, 1988, 1 page.
Adhikari et al., "Mixed Macrodiol-Based Siloxane Polyurethanes: Effect of the Comacrodiol Structure on Properties and Morphology," *Journal of Applied Polymer Science*, 2000, vol. 78, pp. 1071-1082.
Bullock et al., "Surface Science of a Filled Polydimethylsiloxane-Based Alkoxysilane-Cured Elastomer: RTV11$^{1}$." *Journal of Colloid and Interface Science*, 1999, vol. 210, pp. 18-36, Article ID jcis.1998. 5856, available online at http://www.idealibrary.com.
Casse et al., "Laboratory screening of coating libraries for algal adhesion," *Biofouling*, 2007, vol. 23, Nos. 3/4, pp. 267-276.
Chen et al., "Solvent Effects on the Surface Composition of Poly(dimethylsiloxane)-*co*-Polystyrene/Polystyrene Blends," *Macromolecules*, 1998, vol. 31, No. 26, pp. 9328-9336.
Ekin et al., "Combinatorial and High-Throughput Screening of the Effect of Siloxane Composition on the Surface Properties of Crosslinked Siloxane-Polyurethane Coatings," *J. Comb. Chem.*, 2007, vol. 9, No. 1, pp. 178-188.

Ekin et al., "Library Synthesis and Characterization of 3-Aminopropyl-Terminated Poly(dimethylsiloxane)s and Poly(ε-caprolactone)-b-Poly(dimethylsiloxane)s," *Journal of Polymer Science: Part A: Polymer Chemistry*, 2006, vol. 44, No. 16, pp. 4880-4894.

Ekin et al., "Synthesis and Characterization of Novel Hydroxyalkyl Carbamate and Dihydroxyalkyl Carbamate Terminated Poly(dimethylsiloxane) Oligomers and Their Block Copolymers with Poly(ε-caprolactone)," *Macromolecules*, 2006, vol. 39, No. 25, pp. 8659-8668.

Ekin et al., "Synthesis, formulation, and characterization of siloxane-polyurethane coatings for underwater marine applications using combinatorial high-throughput experimentation," *J. Coat. Technol. Res.*, 2007, vol. 4, No. 4, pp. 435-451.

El-Hayek et al., Bacteriostatic polymer film immobilization. *Journal of biomedical materials research. Part A*, 2006, vol. 79 No. 4, pp. 874-881 (Plus Cover Sheet, 9 pages total).

Holohan et al., "Monofunctional polydimethylsiloxane oligomers for graft copolymerization," *Macromol. Chem. Phys.*, 1994, vol. 195, No. 9, pp. 2965-2979 (Plus cover Sheet, 16 pages total).

Iojoiu et al., "Modified poly (ε-caprolactone)s and their use for drug-encapsulating nanoparticles," Journal of Polymer Science Part A: Polymer chemistry, 2004, vol. 42, No. 3, pp. 689-700.

Jiang et al., Preparation of crosslinked polystyrenes with quaternary ammonium and their antibacterial behavior *Reactive & Functional Polymers 2005*, vol. 62, 5 pages.

Johnston et al., "Networks from α,ω-Dihydroxpoly(dimethylsiloxane) and (Tridecafluoro-1,1,2,2-tetrahydrooctyl)triethoxysilane: Surface Microstructures and Surface Characterization," *Macromolecules*, 1999, vol. 32, No. 24, pp. 8173-8182.

Karal et al., "Blend of polycaprolactone-poly (dimethylsiloxane)-polycaprolactone triblock copolymer with poly(vinyl chloride) preparation and characterization," Polymer, 1997, vol. 38, No. 24, pp. 6071-6078.

Kawakami et al., "Silicone Macromers for Graft Polymer Synthesis," *Polymer Journal*, 1982, vol. 14, No. 11, pp. 913-917.

Lenoir et al., Antimicrobial activity of polystyrene particles coated by photo-crosslinked block copolymers containing a biocidal polymethacrylate block. e-Polymers 2005, 11 pages.

Majumdar et al., "Thermoset Siloxane-Urethane Fouling Release Coatings," *A.C.S. Symposium Series*, 2007, vol. 957, pp. 61-75.

Pieper et al., "Combinatorial approach to study the effect of acrylic polyol composition on the properties of crosslinked siloxane-polyurethane fouling-release coatings," *J. Coat. Technol. Res.*, 2007, vol. 4, No. 4, pp. 453-461.

Schweizer, Triclosan: a widely used biocide and its link to antibiotics. *FEMS Microbiology Letters*, 2001, vol. 202, No. 1, pp. 1-7 (Plus Cover Sheet, 9 pages total).

Smetankina et al., "Reactivity of organosilicon diisocyanates," XVII, Carcofunctional organosilicon compounds, Zhurnal Obshchei Khimii, 1974, vol. 44, No. 12, pp. 2638-2641.

Stafslien et al., "Combinatorial materials research applied to the development of new surface coatings IV. A high-throughput bacterial biofilm retention and retraction assay for screening fouling-release performance of coatings," *Biofouling*, 2007, vol. 23, No. 1, pp. 45-54.

Tang et al., "Anti-inflammatory properties of triblock siloxane copolymer-blended materials," Biomaterials, 1999, vol. 20, pp. 1365-1370.

Tezuka et al., "Environmentally induced Macromolecular Rearrangement on the Surface of Polyurethane-Polysiloxane Block Copolymers," *J. Chem. Soc. Paraday Trans.*, 1991, vol. 87, pp. 147-152.

Tezuka et al., "Environmentally Induced Macromolecular Rearrangement on the Surface of Polyurethane-Polysiloxane Graft Copolymers," *Journal of Colloid and Interface Science*, May 1990, vol. 136, No. 2, pp. 408-414.

Thomas et al., "Silicones Containing Pendant Biocides for Antifouling Coatings," *Biofouling*, vol. 20, Nos. 4/5, Aug./Oct. 2004, pp. 227-236.

Yilgor et al., "Novel triblock siloxane copolymer: Synthesis, characterization, and their use as surface modifying additives," Journal of Polymer Science Part A: Polymer chemistry, 1989, pp. 3673-3690.

Zhuang et al., "Determination of the Distribution of Poly(dimethylsiloxane) Segment Lengths at the Surface of Poly[(dimethylsiloxane)-urethane]-Segmented Copolymers by Time-of-Flight Secondary Ion Mass Spectrometry," *Macromolecules*, 1997, vol. 30, No. 4, pp. 1153-1157.

Chen, X; Gardella, J.A., Jr; Ho, T.; Wynne, K. J., "*Macromolecules*", 1995, 28, 1635-1642.

Ha, C.-S.; Gardella, J.A.,Jr., *Journal of Macromolecular Science, Polymer Reviews*, 2005, C45, 1-18.

Ho, T,; Wynne, K. J.; Nissan, R.A.; *Macromolecules*, 1993, 26, 7029-7036.

Lee, Y.; Akiba, I.; Akiyama, S., *Journal of Applied Polymer Science*, 2003, 87, 375-380.

Mahoney, C.M.; Gardella, J. A., Jr.; Rosenfeld, J. C., *Macromolecules*, 2002, 35, 5256-5266.

Patel, N. M.; Dwight, D. W.; Hedrick, J. L.; Webster, D. C.; McGrath, J. E., *Macromolecules*, 1988, 21, 2689-2696.

Smith, S. D.; Desimone, J.M.; Huang, H.; York, G.; Dwight, D. W.; Wilkes, G. L., McGrath, J. E., *Macromolecules*, 1992, 25, 2575-2581.

Tanaka, H.; Hideme, T.; Atsunori, T.; Takafumi, H.; Toshio, N., *Physical Review Letters*, 1992, 68(18), 2794-2797.

Wynne, K. J.; Ho, T.; Nissan, R. A.; Chen, X.; Gardella, J. A., Jr., *ACS Symposium Series*, 1994, 572, 64-80.

* cited by examiner

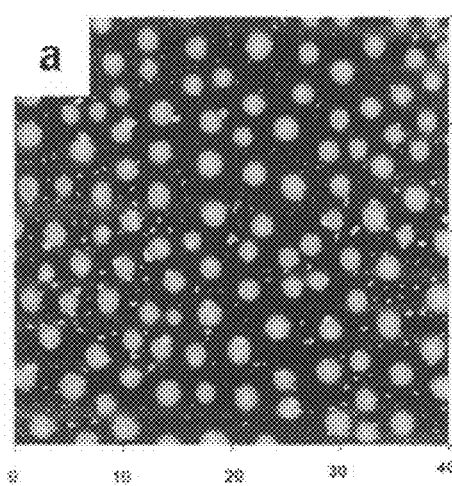
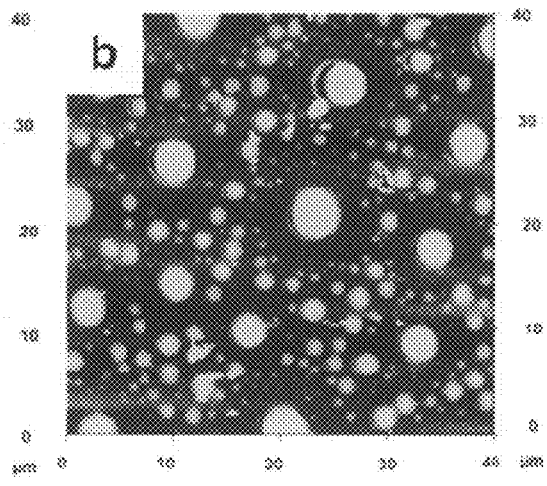
FIG 7(a)                    FIG 7(b)
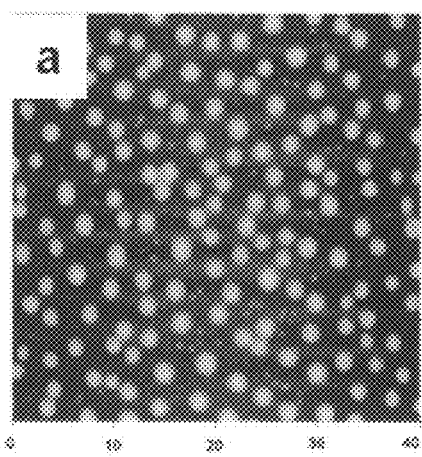
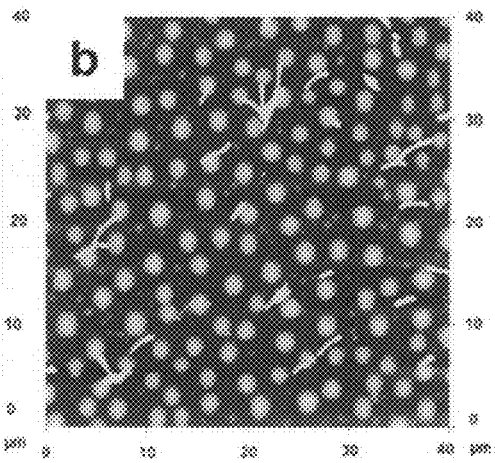
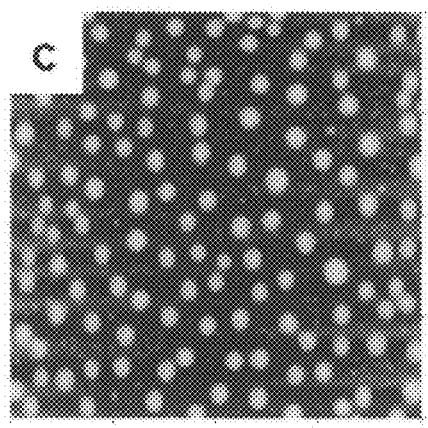
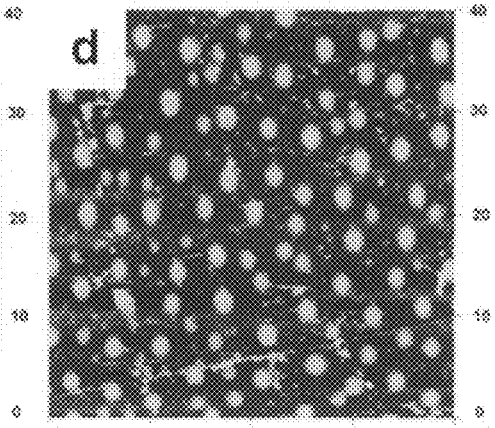
FIGS. 8(a)-(d)

POLYMERIC MATERIAL WITH SURFACE MICRODOMAINS

CROSS-REFERENCE TO RELATED PATENT APPLICATIONS

This application is a continuation of International Application No. PCT/US2006/000166, filed on Jan. 4, 2006, entitled "Polymeric Material That Forms Surface Microdomains;" which claims the benefit of U.S. Provisional Application No. 60/644,355, filed on Jan. 14, 2005, entitled "Composition Having A Stable Topographical Surface Structure," U.S. Provisional Application No. 60/691,317, filed on Jun. 16, 2005, entitled "Composition Having A Stable Topographical Surface Structure," and U.S. Provisional Application No. 60/743,005, filed on Dec. 2, 2005, entitled "Polymeric Material That Forms Surface Microdomains;" all of which are expressly incorporated herein by reference in their entireties, as if the complete and entire text, and figures, had been included herein.

GOVERNMENT RIGHTS STATEMENT

This invention was made with government support under Grant Nos. N00014-03-1-0702 and N00014-04-1-0597 awarded by the Department of Defense, Office of Naval Research. The government has certain rights in the invention.

BACKGROUND

Block copolymers containing poly(dimethyl siloxane) (PDMS) are well known. Typically, these are linear copolymers made up of long sequences of PDMS covalently coupled to another polymer. For example, diblock, triblock, and segmented/multiblock copolymers of PDMS with a variety of polymers have been prepared.

Block copolymers of PDMS with other polymers typically phase separate as a result of the immiscibility of the two different blocks. However, due to the covalent linkage between the blocks, the phase separation is restricted and only micro- or nano-scale phase separation occurs. In many PDMS block copolymer systems, PDMS has a significantly lower surface energy than the second block, and thus tends to predominate on the surface of the copolymer.

Block copolymers of PDMS with polyurethane are also known. In many cases, these may function as minimally adhesive surfaces. However, over time, the more hydrophilic polyurethane components may migrate to the surface resulting in a loss of the low surface energy. This is especially a problem when the copolymer is exposed to an aqueous environment (e.g., when used as a marine coating, etc.).

Accordingly, it would be desirable to provide an improved polymeric material, particularly one that is capable of forming stable surface microdomains when exposed to water. It would also be desirable to provide an improved polymeric material having a defined topography.

SUMMARY

A cross linked polymeric material is described herein that includes polyorganosiloxane and polyurethane components and may form a topographical surface structure that can be stable in an aqueous environment. The polymeric material may include raised microdomains, e.g., raised microdomains made predominantly of the polysiloxane component surrounded by a polyurethane matrix. The microdomains may be regular microdomains.

In one embodiment, the polymeric material may be prepared by reacting a composition which includes polyol, polyisocyanate, and polyorganosiloxane having functional groups capable of reacting with the polyisocyanate. The polymeric material may have a surface that includes raised microdomains. The microdomains may also be stable when exposed to water for more than 14 days. The polyorganosiloxane may include hydroxy functional polyorganosiloxane such as hydroxy functional polydimethylsiloxane (e.g., hydroxy alkyl functional polydimethylsiloxane). The polyol may include polyester polyols, polyether polyols, polycarbonate polyols, and acrylic polyols. In one embodiment, the polyol may include polyol having at least three hydroxy groups. The polyisocyanate may include polyisocyanate having at least three isocyanate groups.

In another embodiment, the polymeric material may be prepared by reacting a composition which includes polyol, polyisocyanate, and polyorganosiloxane having functional groups capable of reacting with the polyisocyanate. The polyol typically has at least three hydroxy groups and/or the polyisocyanate has at least three isocyanate groups. The use of at least tri-functional polyols and/or isocyanates can allow the polymeric material to cross link together to form a more stable surface structure.

In another embodiment, a cross linked polymeric material may be prepared by reacting a composition comprising up to 15 wt % polyhydroxy functional polyorganosiloxane, base on the total solids content of the polymeric material, together with polyol and polyisocyanate.

In another embodiment, a cross linked polymeric material may be prepared by reacting a composition comprising polyol, polyisocyanate, and polyorganosiloxane having functional groups capable of reacting with the polyisocyanate to form a polymeric material includes surface microdomains that are more hydrophobic than the surrounding polymer matrix. The surface microdomains may include the siloxane polymer and the surrounding matrix may include polyurethane. The surface domains may have a hydrophobicity which does not appreciably change when exposed to water for 14 days.

A coating composition may be prepared that may be used to coat a substrate such as metal, wood, glass, etc. so that upon curing, the coating composition forms the polymeric material described previously. In one embodiment, the coating composition may include up to 15 wt %, based on the total solids in the coating composition after the coating composition has cured, of polyol, polyisocyanate, polyorganosiloxane having functional groups which are capable of reacting with the polyisocyanate, and a solvent component. The solvent component may include alkyl alkoxypropionate, dialkyl ketone, and/or alkyl acetate. The coating composition may also include a pot life extender such as alkane-2,4-dione, N,N-dialkyl acetoacetamide, alkyl acetoacetate. An isocyanate reaction catalyst such as an organotin compound or tertiary amine may be used to catalyze reaction of the components in the composition.

In another embodiment, a method for preparing and using the coating composition comprises adding isocyanate reaction catalyst to a composition comprising polyol, polyisocyanate, and polyorganosiloxane having functional groups capable of reacting with the polyisocyanate to form a coating composition and applying the coating composition to a substrate. The coating composition cures on the substrate to form a polymeric material that has raised microdomains.

Polymeric materials as described herein may be used in a number of different settings such as for creating minimally adhesive surfaces that may be useful as release paper for adhesive labels, anti-graffiti coating, and fouling release coatings for marine vessels.

DRAWINGS

FIG. 7 shows a comparison of atomic force microscopy images of the polymeric material from Sample 1 in Table 2 (a) before immersion in water and (b) after two weeks immersion in water.

FIG. 8 shows a comparison of atomic force microscopy images of the polymeric material from Sample 2 in Table 2 before water immersion (8(*a*) and (*c*)) and after immersion in water for two weeks (8(*b*) and (*d*)).

DETAILED DESCRIPTION

Figure 1:
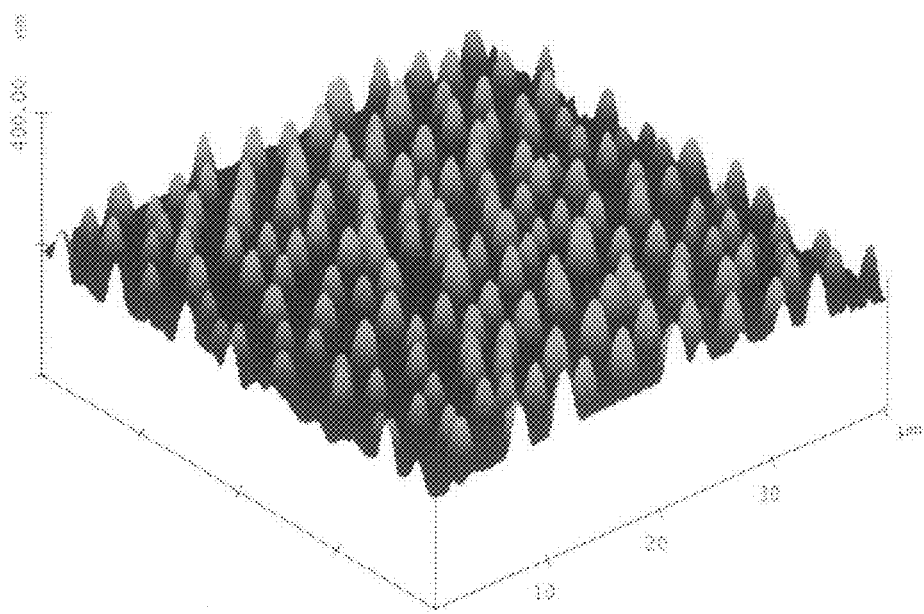
FIGS. 1-2 are atomic force microscopy images of the surface of the polymeric material from Sample 1 in Table 2.

A cross linked polymeric material is described herein. In certain embodiments, the polymeric material may be capable of forming a topographical surface structure which is stable in an aqueous environment. Such a surface structure may be stable in an aqueous environment, the polymeric material may be more useful and its properties more stable in applications such as marine coatings, coatings on medical instruments or devices, etc.

In general, the polymeric material may be prepared by reacting a composition that includes polyol, polyisocyanate, and polyorganosiloxane that has functional groups capable of reacting with the polyisocyanate. In order to cross link the polymeric material, at least one of the polyol, polyisocyanate, or the polyorganosiloxane includes at least three functional groups which can react with the other components in the composition. For example, in one embodiment, the polyol may include three or more hydroxy groups or the polyisocyanate may include three or more isocyanate groups. In some embodiments where more cross linking is desired, the composition may include polyol having at least three hydroxy groups and polyisocyanate having at least three isocyanate groups.

In one embodiment, the polymeric material has a surface that includes regular, raised microdomains of the siloxane polymer surrounded by a polyurethane matrix. Because the siloxane polymer is more hydrophobic than the polyurethane, the polysiloxane rich microdomains are more hydrophobic than the surrounding polyurethane rich matrix. In some embodiments, the surface morphology may be locked in place so that the microdomains do not appreciably change in size and shape when exposed to water for more than 14 days. In other embodiments, the microdomains may remain upon exposure to water, but may undergo varying degrees of change or reorientation.

The microdomains may be any of a number of sizes. The average diameter of the microdomains may range from about 0.1 microns to 10 microns, desirably, from about 0.5 microns to 5 microns, or, suitably, about 1 micron to 3 microns. The average height of the microdomains may range from about 0.01 microns to 0.2 microns, desirably, from about 0.025 microns to 0.15 microns, or, suitably, from about 0.03 microns to 0.1 microns. In one embodiment, the microdomains may be spaced apart at regular intervals and be of a substantially uniform size. For example, the microdomains may have an average spacing of about 0.5 microns to 10 microns or, desirably, about 1 micron to 5 microns.

The polymeric material may also have a microdomain surface density of about 0.1 to 1.5 microdomains/micron or, typically, about 0.2 to 0.65 microdomains/micron$^2$. It should be appreciated that the polymeric material may have any suitable microdomain surface density.

The polyol used to prepare the polymeric material may be any of a number of polyols. Suitable polyols may include polyester polyols, polyether polyols, polycarbonate polyols, and acrylic polyols. As mentioned previously, the polyol may have at least three hydroxy groups to facilitate cross linking of the polymeric material. In one embodiment, the polyol may include polycaprolactone polyol such as a polycaprolactone triol. In another embodiment, the polyol may have an average hydroxyl equivalent weight of about 100 to 300 or, desirably, 150 to 200. The polymeric material may include about 10 wt % to 40 wt % or, desirably, about 20 wt % to 30 wt % of the polyol, based on the total solids content of the polymeric material.

Any of a number of suitable polyisocyanates may be used to prepare the polymeric material. As mentioned previously, the polyisocyanate may have at least three isocyanate groups to facilitate cross linking of the polymeric material. In one embodiment, the polyisocyanate may include an isophorone based polyisocyanate. In another embodiment, the polyisocyanate may have an isocyanate equivalent weight of about 150 to 600 or, desirably about 250 to 450. The polymeric material may include about 30 wt % to 85 wt % or, desirably, about 50 wt % to 75 wt % of polyisocyanate, based on the total solids content of the polymeric material.

Any of a number of polyorganosiloxanes may be used as long as it is capable of reacting with the polyisocyanate. For example, the polyorganosiloxane may include hydroxy or amino functional polyorganosiloxane such as hydroxy or amino functional PDMS. In one embodiment, the polyorganosiloxane may include hydroxy or amino alkyl functional polyorganosiloxane such as hydroxy and/or amino propyl functional polyorganosiloxane. In another embodiment, the polyorganosiloxane may have an average hydroxyl equivalent weight of about 200 to 800 or, desirably, about 350 to 700.

One suitable polyorganosiloxane may be α,ω-bis[3-(2'-hydroxyethoxy)propyl]polydimethylsiloxane. In some embodiments, the polymeric material may include about 1 wt % up to 15 wt %, based on the total solids content of the polymeric material, of polyorganosiloxane, while in other embodiments, the polymeric material may include less than about 15 wt % or no more than about 14 wt % of the polyorganosiloxane. In other embodiments, the polymeric material may include about 2 wt % to 14 wt %, about 3 wt % to 13 wt %, or, suitably, 5 wt % to 12 wt %. The PDMS may also have any suitable molecular weight. In one embodiment, the molecular weight of the PDMS may be no more than about 10,000 g/mole, no more than about 7,500 g/mole, or, suitably, no more than about 5,000 g/mole. In other embodiments, the PDMS may have a molecular weight that is above 10,000 g/mole.

A coating composition may be prepared which can be applied to a substrate so that upon curing the polymeric material described herein is formed. The coating composition may include polyol, polyisocyanate, polyorganosiloxane, and a solvent component. The solvent component may include alkyl propionate (e.g., lower alkyl propionate, preferably having 5 to 10 carbon atoms), alkoxypropionate, alkyl alkoxypropionate (e.g., lower alkyl alkoxypropionate, preferably having 5 to 10 carbon atoms), alkoxyalkyl propionate (e.g., alkoxyalkyl propionate having 5 to 10 carbon atoms), dialkyl ketone (e.g., dialkyl ketone having 5 to 10 carbon atoms), alkyl acetate (e.g., lower alkyl acetate, preferably having 5 to 10 carbon atoms), alkyl alkoxyacetate (e.g., lower alkyl alkoxyacetate, preferably having 5 to 10 carbon atoms), alkoxyalkyl acetate (e.g., alkoxyalkyl acetate having 5 to 10 carbon atoms), toluene, and/or xylene. In one embodiment, the solvent component may include ethyl 3-ethoxypropionate (EEP), methyl n-amyl ketone (MAK), and/or butyl acetate. The coating composition may also include a pot life extender such as alkane-2,4-dione (e.g., 2,4-pentanedione), N,N-dialkyl acetoacetamide, or alkyl acetoacetate. The amount of the components in the coating composition may be the amounts in the examples below or within 15% above or below the amount of any particular component of any example in the examples section.

In one embodiment, the solvent component may include BuAc, EEP, and MAK. The ratio of MAK:EEP may vary from about 45:5 to 5:45. In general, the average diameter of the domains formed may increase as the ratio changes to include greater amounts of EEP. In another embodiment, the solvent component may have a formation vapor pressure that is no more than about 12 mm of Hg or, desirably, no more than about 11 mm of Hg.

The coating composition may also include an isocyanate reaction catalyst such as dialkyl tin dicarboxylate, trialkyltin hydroxide, dialkyltin oxide, dialkyltin dialkoxide, dialkyltin dihalide, or a mixture thereof, which is used to initiate the reaction. Suitable examples of isocyanate reaction catalysts include diethyl tin diacetate, dibuyltin diacetate, dibutyltin dilaurate, dibutyltin maleate, dilauryltin diacetate, dioctyltin diacetate, or a mixture thereof. In one embodiment the isocyanate reaction catalyst includes a tin catalyst.

In general, the coating composition may be prepared by mixing all of the components except for the polyisocyanate and the isocyanate reaction catalyst. The polyisocyanate and the isocyanate reaction catalyst are added and then the composition is allowed to react for a time before it is applied to a substrate. The amount of time before the coating is applied to the substrate is dependent on the inclusion level of the isocyanate reaction catalyst and/or inclusion levels of the polyorganosiloxane, polyol, and/or polyisocyanate. Once the coating composition has been applied to the substrate it is allowed to cure at room temperature followed by a force dry at 80° C.

EXAMPLES

The following examples are provided by way of illustration and are not intended to limit the scope of the claims. All percentages are by weight unless otherwise noted. The materials shown in Table 1 were used in the examples and were supplied by the suppliers shown.

TABLE 1

| Material | Supplier |
|---|---|
| PDMS A[1] (hydroxyl equiv. wt. of 500 g/eq.; Mn = 1000 g/mole) | Chisso Corporation (FM4411) |
| PDMS B[2] (amine equiv. wt. of 6215 g/eq.) | — |
| PDMS C[2] (amine equiv. wt. of 12307 g/eq.) | — |
| Polycaprolactone (PCL) triol (hydroxyl equiv. wt. of 180 g/eq.) | Dow Chemical (Tone 0305) |
| Polyisocyanate D[3] (isocyanate equiv. wt. of 342 g/eq.) | Rhodia (Tolonate XIDT 70B; 70% in BuAc) |
| Polyisocyanate E[4] (isocyanate equiv. wt. of 212 g/eq.) | Rhodia (Tolonate HDT 90) |
| Dibutyltin diacetate catalyst (DBTDA) | Aldrich |
| Ethyl 3-ethoxypropionate (EEP) | Eastman |
| Methyl n-amyl ketone (MAK) (polyurethane grade) | Eastman |
| Butyl acetate (BuAc) | Eastman |
| Aromatic 100 (Ar) | Aldrich |
| 2,4-pentanedione | Aldrich |
| Isopropyl alcohol (IPA) | VWR International |

[1]Hydroxy terminated α, ω-bis [3-(2'-hydroxyethoxy) propyl] polydimethylsiloxane.
[2]3-aminopropyl terminated PDMS.
[3]Polyisocyanurate timer based on isophorone diisocyanate.
[4]Hexane diisocyanate based.

PDMS B was synthesized as follows. In a 250-ml three necked round bottom flask 2.04 g 1,3-bis(3-aminopropyl)-1,1,3,3-tetramethyldisiloxane and 10 g octamethylcyclotetrasiloxane were mixed. The solution was heated with stirring under nitrogen. By the time the temperature reached 80° C., 0.1% catalyst (tetramethylammonium 3-aminopropyl dimethyl silanolate) was placed into the solution. After one hour of heating the viscosity increased slightly, and the remaining octamethylcyclotetrasiloxane (90 g) was placed into an addition funnel and added drop wise into the solution. The dropwise addition of octamethylcyclotetrasiloxane was added over 7-10 hours. After the completion of the addition of all octamethylcyclotetrasiloxane, the heating was continued for an additional 2-3 hours. Then, the temperature was increased from 80° C. to 150° C. and kept at that temperature to decompose the catalyst. After the decomposition the solution was cooled down to room temperature.

PDMS C was synthesized by following the above procedure for PDMS B using 1.02 g 1,3-bis(3-aminopropyl)-1,1,3,3-tetramethyldisiloxane, plus 5 g octamethylcyclotetrasiloxane in the initial charge with 95 g octamethylcyclotetrasiloxane added using the addition funnel.

Atomic force microscopy (AFM) studies were performed on a Dimension 3100 microscope with Nanoscope IIIa controller (Digital Instruments, Inc. California). Experiments were carried out by tapping mode in air under ambient conditions or by contact mode under water. Silicon probes with spring constant 0.1-0.4 N/m and resonant frequency 17-24 kHz were used. The setpoint ratio for collection of TMAFM data was 0.9.

Nanoindentation measurements were conducted using the Dimension 3100 microscope with a Berkovich type diamond indenter probe. The spring constant for the probe was 177.3 N/m. Force-deflection curves from a standard sapphire substrate were used for calibration of deflection voltage and found to average 220.8 nm/V. A threshold force value of 20 µN was used to obtain an array of indentations over the surface of the coating.

For SEM (scanning electron microscopy) experiments, samples were mounted on aluminum mounts and coated with gold using a Technics Hummer II sputter coater. Images were obtained using a JEOL JSM-6300 scanning electron microscope. X-ray information was obtained via a ThermoNoran EDS detector using a VANTAGE Digital Acquisition Engine.

For TEM (transmission electron microscopy) experiments, samples were embedded in Epon-Araldite-DDSA and cross-sectioned using a microtome at 60 nm thickness. Images of the cross-sections were obtained using a JEOL JEM-100CX II electron microscope.

Example 1

Figure 4:
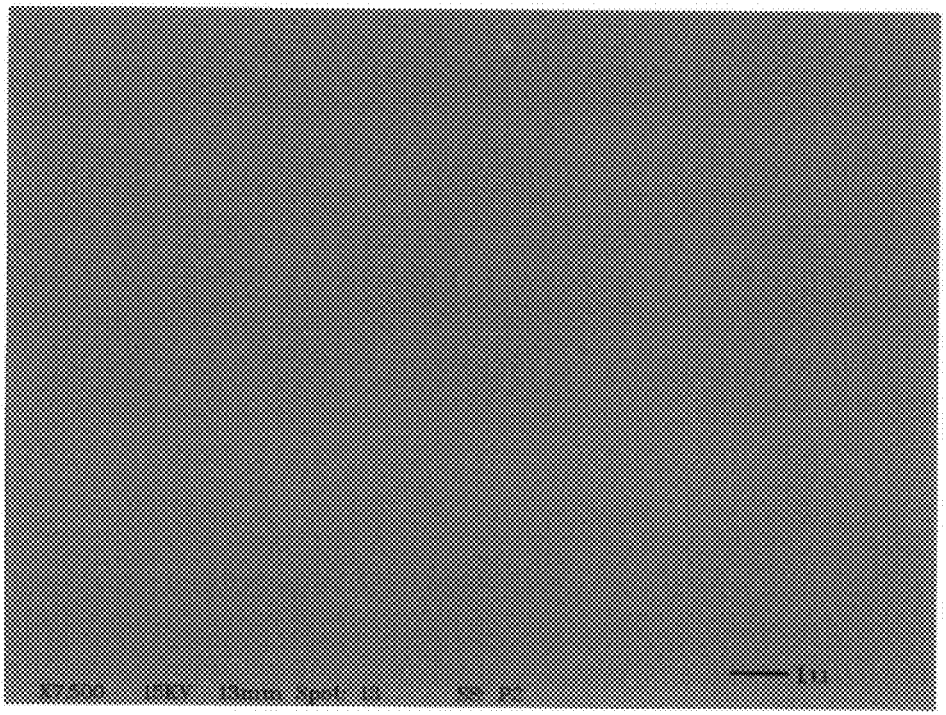
FIG. 4 is a scanning electron microscope image of the surface of the polymeric material from Sample 3 in Table 2.
Figure 5:
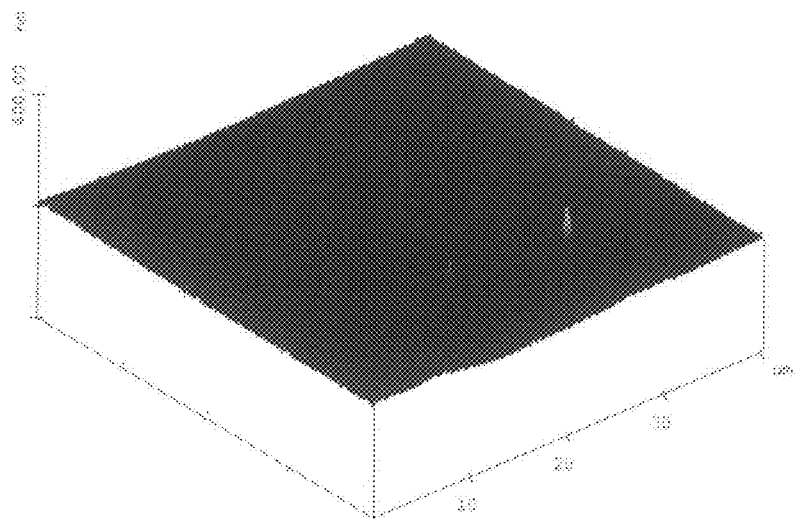
FIG. 5 is an atomic force microscopy image of the surface of the polymeric material from Sample 3 in Table 2.

The polymeric material formulations shown as Samples 1-9 in Table 2 were prepared according to the following procedure. Stock solutions of 30 wt % of PDMS A in EEP, 30 wt % of PDMS B in EEP, 30 wt % of PDMS C in EEP, 90 wt % of PCL triol in MAK, 90 wt % of PCL triol in EEP, 1 wt % of DBTDA in MAK were prepared. For each Sample, 0.075 wt % of DBTDA and 10 wt % 2,4-pentanedione were added on a resin solids basis. For Samples 1-4 and 9, NCO:OH equivalent ratio was kept constant at 1.1:1.0. Samples 1-9 were prepared by weighing and mixing the respective stock solutions of PDMS, PCL triol (90% solution in EEP for Sample 2 and 90% solution in MAK for the remainder of the Samples), and the 2,4-pentanedione thoroughly in a 20 ml vial via magnetic stirring. After thorough mixing, the DBTDA and the polyisocyanate were added and mixed for the specified amount of time shown in Table 2. Coatings were drawn down over aluminum panels and kept under ambient conditions for 24 hours followed by oven curing at 80° C. for 45 minutes. Coating film thickness was 50 to 70 µm.

lower surface energy than the polyurethane, the PDMS was expected to stratify to the coating surface during film formation and crosslinking, resulting in a polyurethane coating having a smooth, low surface energy PDMS outer layer with a tough polyurethane sub-layer. Tapping mode AFM studies of the 20 and 30 percent siloxane-urethane coating compositions (Samples 3 and 4) showed smooth surfaces fully covered by PDMS. SEM and AFM images for Sample 3 are shown in FIGS. 4 and 5, respectively. The polyurethane control containing no PDMS (Sample 9) also had a feature-free surface. Also, Samples 5-8 had smooth surfaces. Only Samples 1 and 2 formed raised microdomains.

Figure 2:
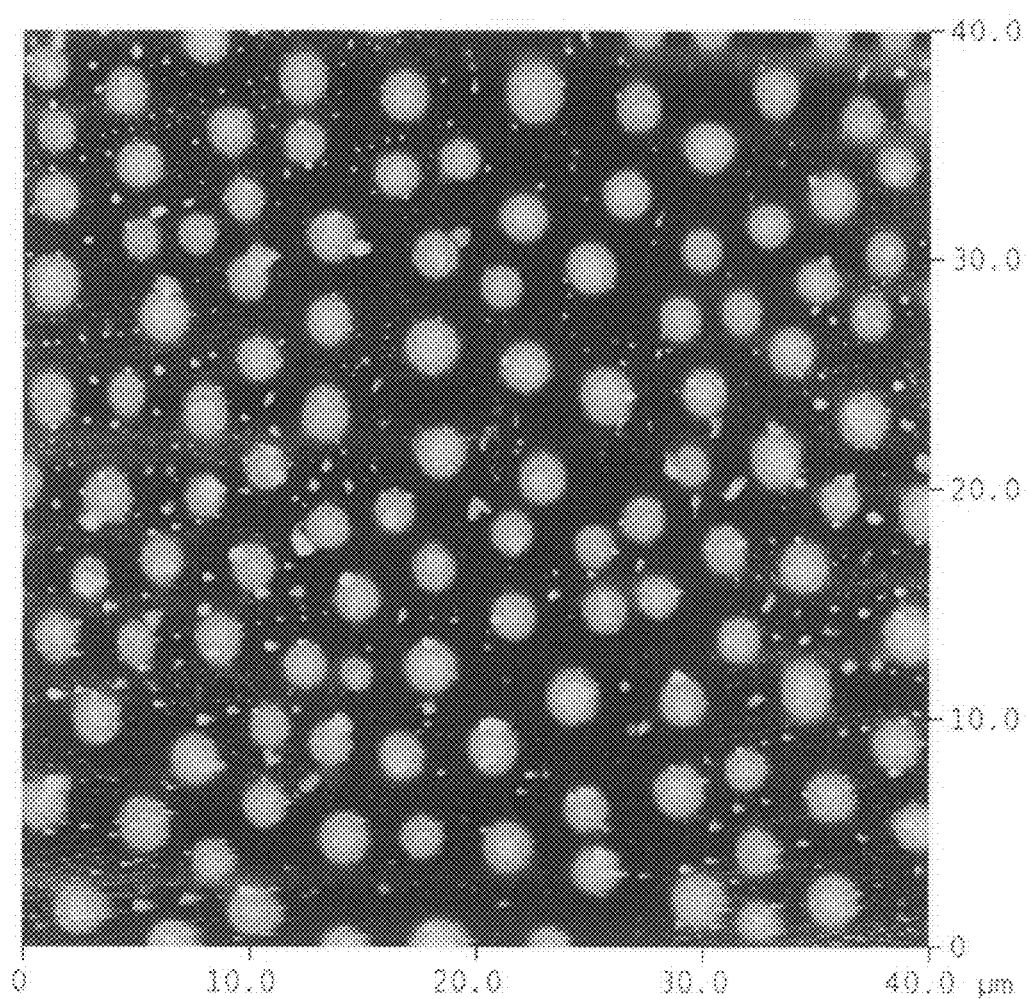
Figure 3:
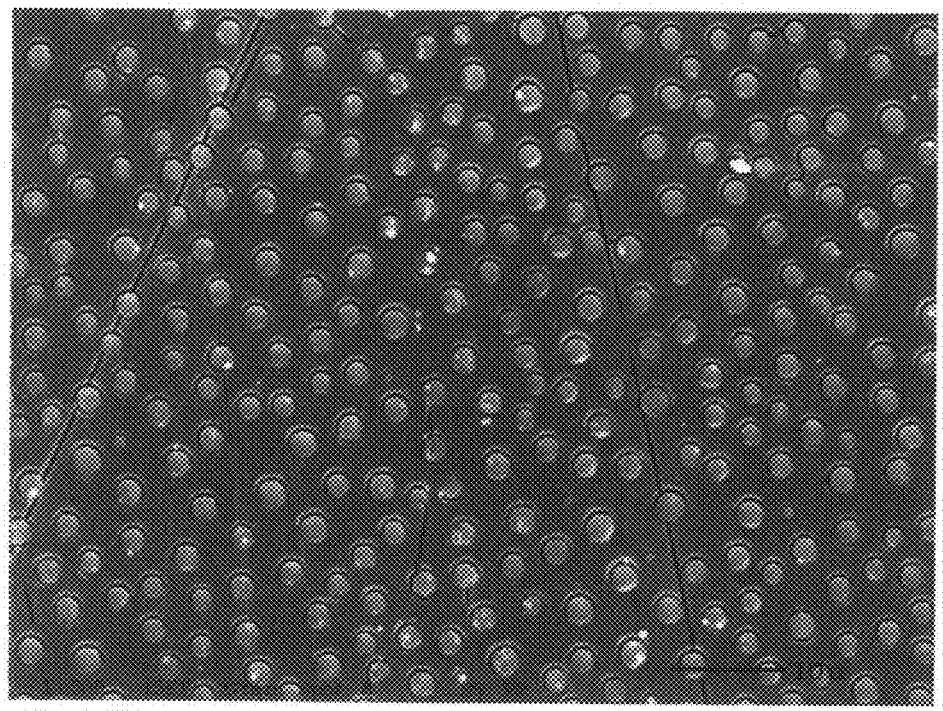
FIG. 3 is a scanning electron microscope image of the surface of the polymeric material from Sample 1 in Table 2.

Sample 1 containing 10% PDMS A yielded a microstructured surface with discrete domains as shown in FIG. 1. The domains have an average diameter of about 1.4 µm and a height of about 50 nm. A planar view of the surface of the polymer formulation from Sample 1 is shown in FIG. 2. An SEM image of Sample 1 is shown in FIG. 3. Interspersed between the larger domains are numerous smaller domains as well. The size distribution of the larger domains is fairly uniform. While it may be assumed that the domains are primarily composed of PDMS, the domain sizes are larger than expected if they were composed solely of the 1000 g/mol PDMS A block. Thus, these domains may include a mixture of PDMS A as well as some of the polyurethane components.

Nanoindentation measurements were conducted on the microstructured siloxane-urethane surface from Sample 1 and also on the control polyurethane surface under the application of the same threshold force value of 20 µN. Depth of indentation at peak load ($h_{max}$) over the microdomains was considerably higher (179.5±3.7 nm) than the surrounding area (83.6±1.8 nm). The $h_{max}$ value obtained on the pure polyurethane surface was 78.3±10.4 nm, close to the value obtained for the matrix of the microstructured surface. Thus, the higher indentation depth indicates that the microdomain modulus is significantly lower than that of the surrounding material and thus the microdomains are primarily composed of PDMS A, while the surrounding material consists of polyurethane containing little or no PDMS A.

TABLE 2

| Sample | PDMS Type | PDMS wt % | PCL triol wt. % | Polyisocyanate Type | Polyisocyanate wt. % | Solvents Type/Ratio | DBTDA wt. %* | Time before application |
|---|---|---|---|---|---|---|---|---|
| 1 | A | 10 | 26.67 | D | 63.33 | EEP:MAK:BuAc 38.34:17.07:44.59 | 0.075 | 3 h |
| 2 | A | 10 | 26.67 | D | 63.33 | EEP:MAK:BuAc 43.21:12.20:44.59 | 0.075 | 3 h |
| 3 | A | 30 | 15.34 | D | 54.66 | EEP:MAK:BuAc 68.26:8.90:22.84 | 0.075 | 6 h |
| 4 | A | 20 | 21.01 | D | 58.99 | EEP:MAK:BuAc 57.09:11.95:30.96 | 0.075 | 6 h |
| 5 | B | 10 | 39.02 | E | 50.98 | EEP:MAK:(BuAc + Ar) 67.93:15.51:16.56 | 0.01 | 15 m |
| 6 | B | 20 | 34.50 | E | 45.50 | EEP:MAK:(BuAc + Ar) 82.53:8.53:8.94 | 0.01 | 15 m |
| 7 | C | 10 | 39.10 | E | 50.90 | EEP:MAK:(BuAc + Ar) 68.09:15.57:16.34 | 0.01 | 15 m |
| 8 | C | 20 | 34.66 | B | 45.34 | EEP:MAK:(BuAc + Ar) 82.67:8.50:8.83 | 0.01 | 15 m |
| 9 | — | 0 | 32.34 | D | 67.66 | MAK:BuAc 26.88:73.12 | 0.075 | 15 m |

*Wt. percent of catalyst is given with respect to total solid weight of polymeric material.

Figures 6A, 6B:
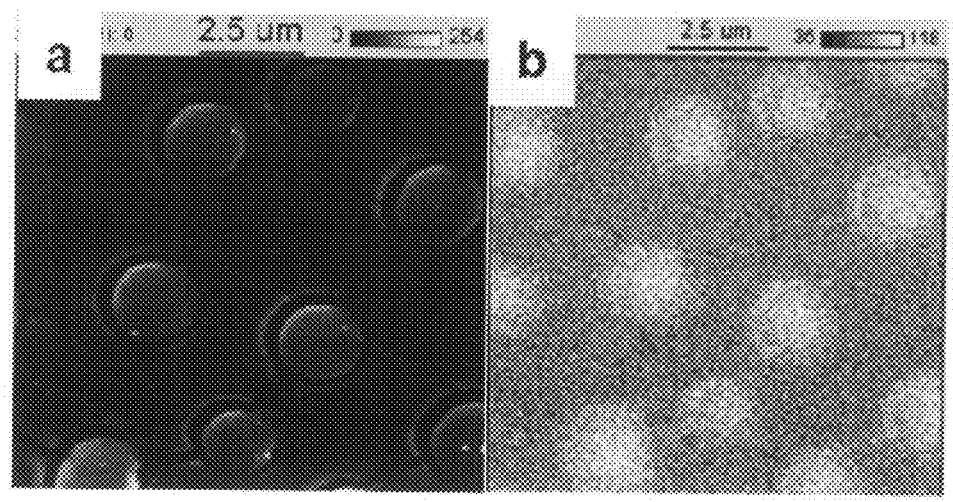
FIG. 6 is (a) a scanning electron microscope image and (b) an X-ray mapping of silicon of the surface of the polymeric material from Sample 1 in Table 2.

The coatings prepared in Samples 1-9 were cast as a solution of the reactive oligomers (e.g., PDMS, PCL triol, polyisocyanate, in the amounts shown in Table 2) in a solvent blend with a catalyst (DBTDA) and a pot-life extender (2,4-pentanedione) as already described. Since PDMS has a much SEM imaging of the surface of Sample 1 also verified the microstructured nature of the polymer surface as shown in FIG. 6(*a*). Energy dispersive X-ray mapping of silicon indicated that the microstructured domains formed at the surface were rich in silicon as shown in FIG. 6(*b*). In contrast, SEM imaging and Si mapping over a featureless siloxane-urethane coating (Sample 3) revealed that silicon was uniformly distributed over the surface.

To verify that the surface domains did not consist of unreacted PDMS on the surface of the coating, the coating from Sample 1 was treated with toluene, which would dissolve unbound PDMS oligomer. AFM studies indicated that, while the domains swelled, they were not removed, and thus are covalently bound to the network.

To study the stability of the microstructured surface of Sample 1 in water, tapping mode AFM images were made after two weeks of water immersion. For comparison purposes, the AFM image from FIG. 2 is reproduced as FIG. 7(a), and the AFM image of the coating from Sample 1 after two weeks of water immersion is shown in FIG. 7(b). The PDMS domains, while they changed in size and size distribution, did not disappear. The mean diameter of the domains was 1.4 μm before water immersion and after water immersion the mean diameter of the larger domains in FIG. 7(b) was 3.82 μm. The fact that some domains were able to grow in size indicates that there is some degree of mobility of the polymer on the surface of this coating. Water can plasticize the polyurethane matrix and allow diffusion of PDMS-rich polymer from domain-to-domain.

The other Sample that formed microdomains was Sample 2, which also contained 10 wt % PDMS A. FIGS. 8(a) and (c) show AFM images of the coating surface of Sample 2 obtained by tapping mode in air before water immersion and by contact mode under water before water immersion, respectively. FIGS. 8(b) and (d) show AFM images of the coating after being immersed in water for two weeks obtained by tapping mode in air after water immersion and by contact mode under water after water immersion, respectively. The microstructured surface domains of the coating of Sample 2 showed a change in mean diameter of 0.17 μm when the coating was immersed in water.

Example 2

In this example, a number of Samples were prepared to determine the effect of the solvent on formation of microdomains in the polymeric material. The formulation of the resin in all of the Samples was 10 wt % PDMS A, 26.67 wt % PCL triol, and 63.33 wt % polyisocyanate D. The solvent study was done using a statistical experimental design approach, based on a D-optimal special cubic mixture design. The solvents investigated in this study were MAK, Toluene, EEP, BuAc, and IPA. Since polyisocyanate D supplied in BuAc was used as a crosslinker, all solvent compositions had a minimum amount of BuAc. Hence during the design of the experiments, the amount of BuAc was varied from 45% to 100% and the balance of the solvents were varied from 0% to 55%. A summary of the design is shown in Table 3 below.

TABLE 3

| Study Type: Mixture Initial Design: D-optimal | | Number of experiments: 35 Design Model: Special Cubic | |
|---|---|---|---|
| Component | Name | Low Value | High Value |
| A | MAK | 0 | 55 |
| B | Toluene | 0 | 55 |
| C | EEP | 0 | 55 |
| D | BA | 45 | 100 |
| E | IPA | 0 | 55 |

Condition: A + B + C + D + E = 100

The Samples were prepared as follows. The thirty-five solvent compositions used are shown in Table 4 below. Stock solutions of 30 wt % of PDMS A, 90 wt % of PCL, 1 wt % of DBTDA were prepared separately in the five solvents studied (MAK, toluene, EEP, BuAc, and IPA). For each Sample, 0.075 wt % DBTDA and 10 wt % 2,4-pentanedione were added on a resin solid basis. Samples were prepared by weighing and mixing the respective stock solutions of PDMS A, PCL triol, 2,4-pentanedione, and DBTDA in a 20 ml vial with magnetic stirring. After thorough mixing, polyisocyanate D was added and mixed thoroughly for four hours. Coatings were drawn down over aluminum panels and kept under ambient conditions for 24 hours followed by oven curing at 80° C. for 45 minutes. Coating film thickness was 50 to 70 μm. The experiments were run in random order.

TABLE 4

| Run order | A: MAK | B: Toluene | C: EEP | D: BA | E: IPA |
|---|---|---|---|---|---|
| 1 | 27.5 | 0 | 27.5 | 45 | 0 |
| 2 | 5.5 | 5.5 | 5.5 | 78 | 5.5 |
| 3 | 55 | 0 | 0 | 45 | 0 |
| 4 | 0 | 0 | 0 | 100 | 0 |
| 5 | 0 | 0 | 0 | 45 | 55 |
| 6 | 5.5 | 5.5 | 5.5 | 50.5 | 33 |
| 7 | 18.33 | 18.33 | 0 | 63.33 | 0 |
| 8 | 18.33 | 0 | 18.33 | 63.33 | 0 |
| 9 | 0 | 0 | 55 | 45 | 0 |
| 10 | 18.33 | 0 | 18.33 | 45 | 18.33 |
| 11 | 0 | 18.33 | 18.33 | 45 | 18.33 |
| 12 | 18.33 | 18.33 | 0 | 45 | 18.33 |
| 13 | 0 | 0 | 27.5 | 72.5 | 0 |
| 14 | 27.5 | 0 | 0 | 45 | 27.5 |
| 15 | 0 | 27.5 | 0 | 45 | 27.5 |
| 16 | 27.5 | 27.5 | 0 | 45 | 0 |
| 17 | 0 | 0 | 0 | 72.5 | 27.5 |
| 18 | 0 | 18.33 | 0 | 63.33 | 18.33 |
| 19 | 18.33 | 0 | 0 | 63.33 | 18.33 |
| 20 | 0 | 27.5 | 0 | 45 | 27.5 |
| 21 | 0 | 0 | 0 | 72.5 | 27.5 |
| 22 | 5.5 | 5.5 | 33 | 50.5 | 5.5 |
| 23 | 33 | 5.5 | 5.5 | 50.5 | 5.5 |
| 24 | 0 | 27.5 | 27.5 | 45 | 0 |
| 25 | 5.5 | 33 | 5.5 | 50.5 | 5.5 |
| 26 | 0 | 0 | 27.5 | 45 | 27.5 |
| 27 | 0 | 0 | 18.33 | 63.33 | 18.33 |
| 28 | 27.5 | 0 | 27.5 | 45 | 0 |
| 29 | 27.5 | 0 | 0 | 72.5 | 0 |
| 30 | 27.5 | 0 | 0 | 72.5 | 0 |
| 31 | 0 | 27.5 | 0 | 72.5 | 0 |
| 32 | 0 | 18.33 | 18.33 | 63.33 | 0 |
| 33 | 18.33 | 18.33 | 18.33 | 45 | 0 |
| 34 | 0 | 55 | 0 | 45 | 0 |
| 35 | 0 | 27.5 | 27.5 | 45 | 0 |

Figure 9:
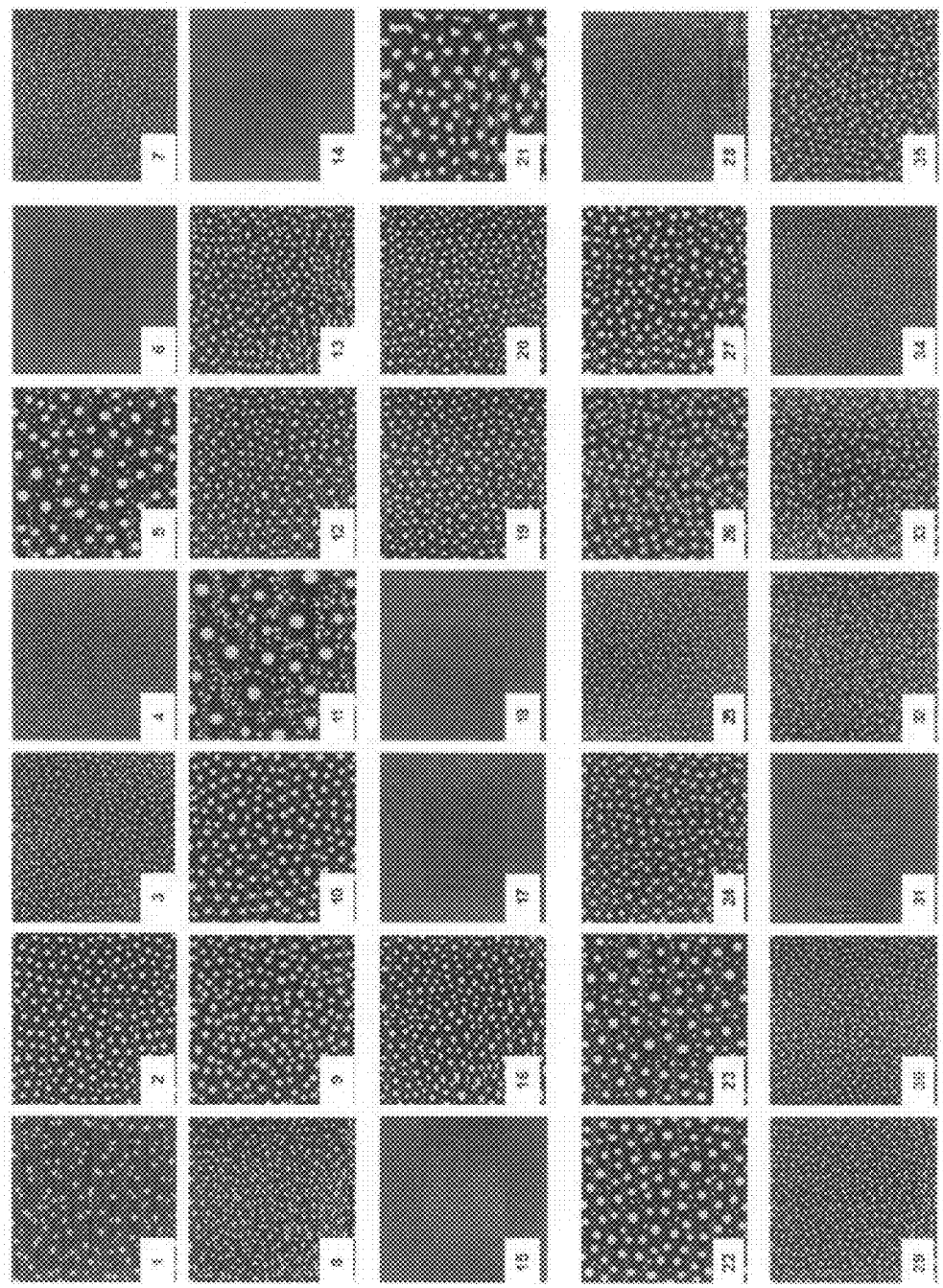
FIG. 9 shows atomic force microscopy images of the polymeric materials prepared using the solvent compositions shown in Table 4.

Following coating application and curing, AFM images (40 μm×40 μm) of all thirty-five coatings were taken by tapping mode in air. Formation of microdomains and their density at the surface were guided by their solvent compositions. All thirty five AFM images are shown in FIG. 9. A range of behavior is observed depending on the solvent compositions used. Domains are absent for some coatings and, when present, a range in domain size is apparent. In order to develop quantitative models of the behavior, numerical responses were generated. Domain formation was considered as one of the responses. "No domain" at the surface was assigned "0" and "1" was assigned for the presence of domains, regardless of their size. For the surfaces with domains, the number of domains per $\mu m^2$ was calculated by the image analysis software and the numerical value was considered in the response. The responses were fit to statistical models. Equations 1 and 2 are the equations of the best fit models for domain formation and domain density, respectively:

$$\text{Domain}=0.97A+0.99B+1.17C+1.01D+0.34E-3.17BD \quad (1)$$

$$\text{Sqrt(Domain density}+0.01)=0.47A+0.66B+0.35C+\\ 0.76D+0.18E-1.85BD-1.26DE \quad (2)$$

Both of these models revealed that interaction terms between the solvents existed. For domain formation, the interaction term BD and for domain density interaction terms BD and DE were significant factors. As all these interaction terms had a negative coefficient, they would not favor domain formation. This implies that combinations of the faster evaporating solvents (BuAc, toluene and IPA) in any solvent composition would not favor formation of a structured surface. Since all solvent compositions had some amount of BuAc, the presence of toluene or IPA in the solvent composition generally would not favor the formation of a structured surface due to their interactions with BuAc.

Further insights on the effect of solvent composition on domain formation can be obtained by specifying a target condition and generating a set of solutions. Two sets of solutions were obtained. The first set was obtained by specifying domain formation equal to zero (i.e. no domain), as shown in Table 5, and second set was obtained by specifying domain formation equal to one (domain formation), as shown in Table 6. The suggested solvent compositions in Table 5 revealed that the absence or a minimal amount of MAK and EEP with a high amount of IPA alone or with a high amount of both toluene and BuAc does not favor formation of a surface with microstructured domains. From Table 6, suggested solvent compositions revealed that absence or minimum amount of IPA and the presence of MAK and EEP would favor formation of microstructured surface domains. These two sets of solvent compositions can be separated with respect to vapor pressure and solubility parameter. For "no domain" formation vapor pressure of the solvent compositions was in the range of 13.95 mm Hg to 24.89 mm Hg and the solubility parameter varied from 8.61 $(cal/cm^3)^{0.5}$ to 9.84 $(cal/cm^3)^{0.5}$. For domain formation vapor pressure of the solvent compositions was in the range of 5.27 mm Hg to 10.54 mm Hg and the solubility parameter varied from 8.56 $(cal/cm^3)^{0.5}$ to 8.62 $(cal/cm^3)^{0.5}$.

TABLE 5

| Solutions | A: MAK | B: Toluene | C: EEP | D: BA | E: IPA |
|---|---|---|---|---|---|
| 1 | 0.00 | 2.02 | 0.08 | 47.73 | 50.16 |
| 2 | 0.00 | 4.31 | 0.00 | 45.15 | 50.54 |
| 3 | 0.00 | 1.03 | 0.00 | 48.70 | 50.27 |
| 4 | 0.00 | 5.25 | 0.00 | 45.00 | 49.75 |
| 5 | 0.00 | 24.53 | 0.00 | 70.01 | 4.56 |

TABLE 6

| Solutions | A: MAK | B: Toluene | C: EEP | D: BA | E: IPA |
|---|---|---|---|---|---|
| 1 | 32.24 | 2.01 | 14.45 | 49.80 | 1.50 |
| 2 | 14.96 | 12.47 | 22.94 | 49.40 | 0.23 |
| 3 | 34.76 | 3.48 | 12.56 | 48.56 | 0.64 |
| 4 | 40.20 | 0.18 | 11.69 | 46.64 | 1.29 |
| 5 | 43.03 | 2.57 | 8.43 | 45.83 | 0.14 |

Example 3

In this example, after considering negative interaction terms in the models (between toluene-butyl acetate and butyl acetate-IPA) and suggested solvent compositions from Table 6, eight different solvent compositions without toluene and IPA were selected for further evaluation. Other than the solvent composition, the formulations and method for preparing the formulations were similar to those formulations prepared in Example 2 (e.g., same amounts of PDMS A, PCL triol, and polyisocyanate D). The selected solvent compositions are shown in Table 7. The amount of BuAc was kept at its minimum level of 45% and the ratio of MAK:EEP were varied systematically from 45:10 to 10:45. Coatings were prepared using the automated formulation and application unit and each of the eight coatings was prepared three times to generate a single library of twenty four Samples. Drawdowns were made over primer coated aluminum panels and over bare aluminum panels. Another set of coatings were prepared in the laboratory over bare aluminum panels. AFM images by tapping mode revealed that these eight solvent compositions always generated microstructured surfaces, as predicted. Hence, the formation of microstructured surface was favored by the elimination of toluene and IPA from the solvent composition as indicated by the model response along with the use of minimum amount of BuAc.

TABLE 7

| Formulation | MAK | EEP | BA |
|---|---|---|---|
| Si-PU 1 | 45 | 10 | 45 |
| Si-PU 2 | 40 | 15 | 45 |
| Si-PU 3 | 35 | 20 | 45 |
| Si-PU 4 | 30 | 25 | 45 |
| Si-PU 5 | 25 | 30 | 45 |
| Si-PU 6 | 20 | 35 | 45 |
| Si-PU 7 | 15 | 40 | 45 |
| Si-PU 8 | 10 | 45 | 45 |

Figure 10:
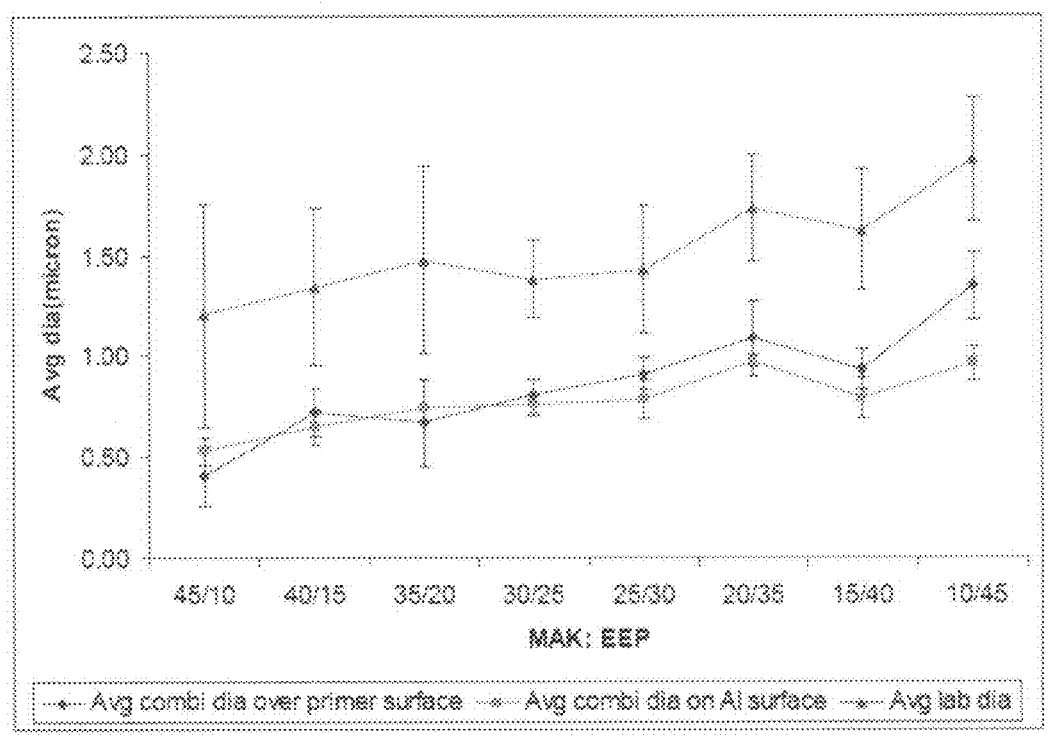
FIG. 10 shows a plot of the mean diameter of microdomains formed in various polymeric materials versus the ratio of MAK:EEP used in the solvent to prepare the polymeric materials.

In order to understand the effect of solvent compositions on the size of the domains, the mean diameter of the domains was plotted against the MAK:EEP ratio, shown in FIG. 10. For coatings prepared using the automated units, the mean domain diameter varied from 0.41 µm to 1.35 µm when applied over a primer coated aluminum panel and was from 0.53 µm to 0.97 µm when applied over a bare aluminum panel. For coatings prepared in the laboratory, the mean diameter increased from 1.2 µm to 1.9 µm as the MAK:EEP ratio was changed from 45:10 to 10:45. Since these are relatively thick films, it is not expected that the substrate will significantly affect the formation of surface domains, and this is reflected in the coatings prepared on two substrates using the automated equipment.

Figure 11:
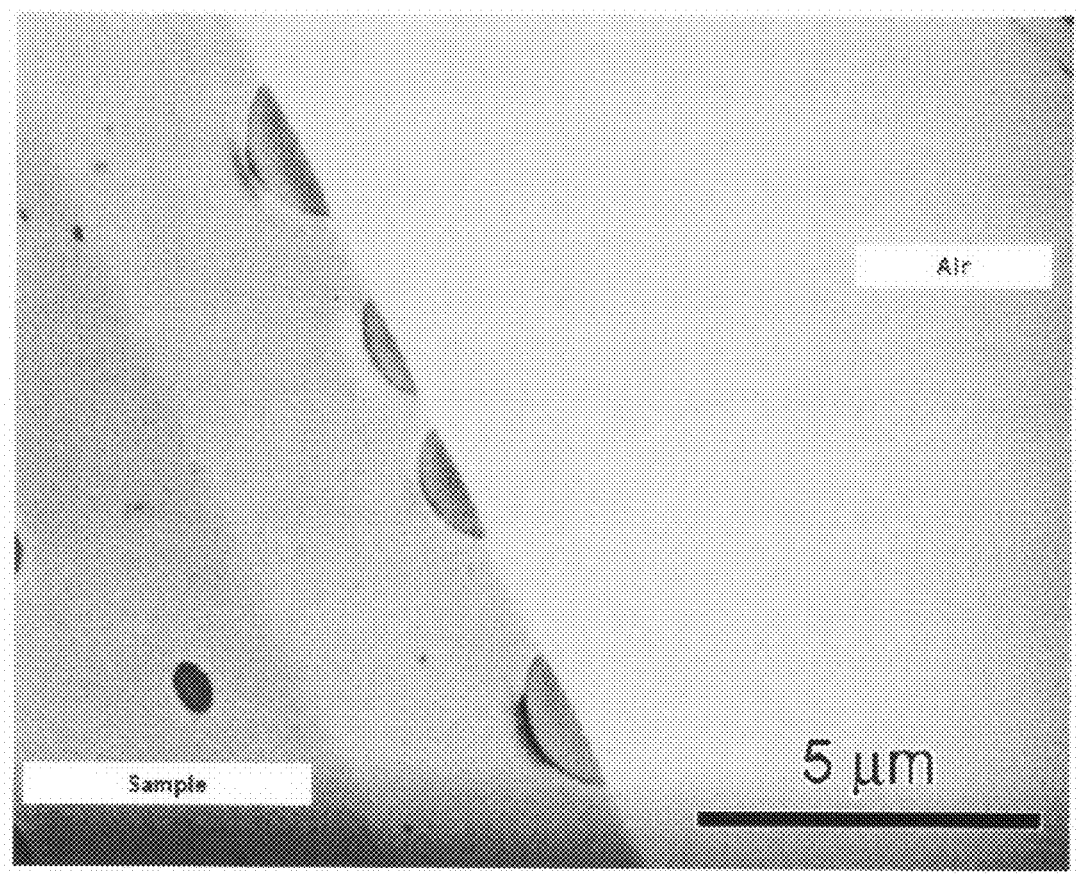
FIG. 11 is a transmission electron microscopy image of the polymeric material from Si—PU 8 shown in Table 7.

Two things occur as MAK is replaced with EEP in this series of formulations. The overall solubility parameter of the solvent compositions increases due to the contribution from the hydrogen bonding interaction parameter. In addition, the overall evaporation rate slows. This means that favorable hydrogen bonding interactions between the solvent and polyurethane occur over a longer time. Higher amounts of EEP may delay the process of phase separation after application, which allows the domains to grow in size. A TEM image of the cross section of the formulation Si—PU 8 is shown in FIG. 11 in order to understand the arrangement of the domains across the film. TEM analysis revealed that the domains are mainly concentrated at the air interface and are darker than the surrounding matrix, which is expected as these domains were mainly composed of PDMS. Domains of a similar size are also observed in the bulk of the Sample as well.

Example 4

In the Samples tested in Examples 2 and 3, the time between mixing of the components and application of the coating on the substrate was held constant at four hours. In this example, in order to understand the effect of mixing time on domain formation, two formulations with the same resin composition (i.e., the same amounts of PDMS A, PCL triol, and polyisocyanate D as Example 2), the same solvent composition (MAK:EEP:BuAc=12:43:45) and pot life extender (2,4-pentanedione, 10% with respect to resin solid) but with two different levels of DBTDA catalyst (0.075%, Series A and 0.15%, Series B) were used. During the preparation of the coatings, all of the reagents other than isocyanate were mixed thoroughly. After isocyanate addition and thorough mixing, draw downs were made at thirty minute intervals over a period of 30 minutes to eight hours or four hours for Series A and Series B, respectively.

Figure 12:
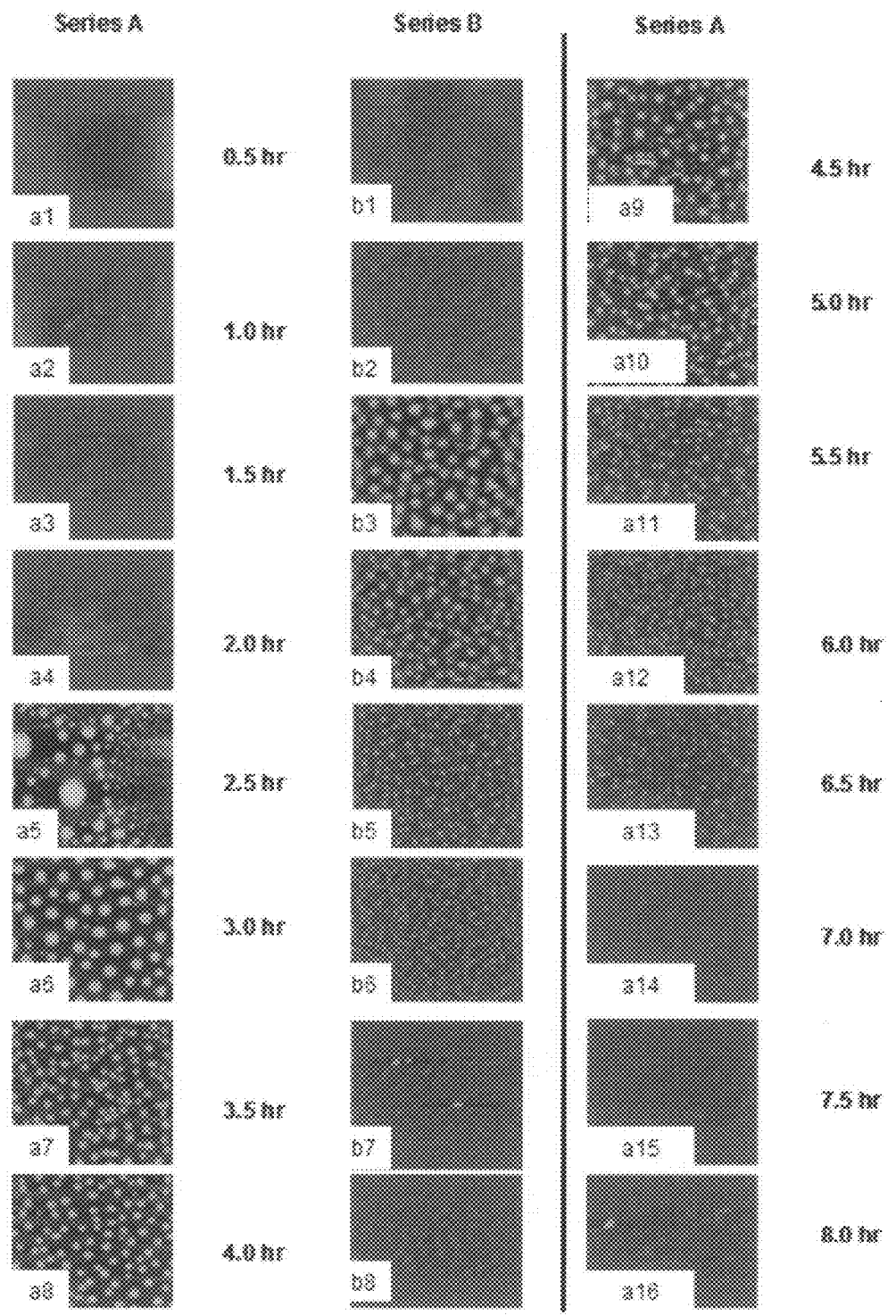
FIG. 12 shows a number of atomic force microscopy images taken to show the effect of kinetics on formation of microdomains in one embodiment of the polymeric material.

AFM images of the cured films were made in air using tapping mode of the series of coatings. The images of Series A (0.075% DBTDA) and Series B (0.15% DBTDA) are shown in FIG. 12. Series A can be subdivided into three stages: 1) No domain formation was observed within first two hours of mixing (a1 to a4). 2) Domains were first observed after 2.5 hours of mixing (a5) and became uniform after three hours of mixing (a6). The domains were uniform in size up to 4.5 hours of mixing (a7 to a9). 3) The domains started to decrease in size after five hours of mixing (a10) and disappeared completely to generate a smooth uniform surface for coatings prepared after seven hours of mixing (a14). This indicates that the formation of microstructured surface domains is a function of mixing time and can be controlled kinetically.

Figure 13:
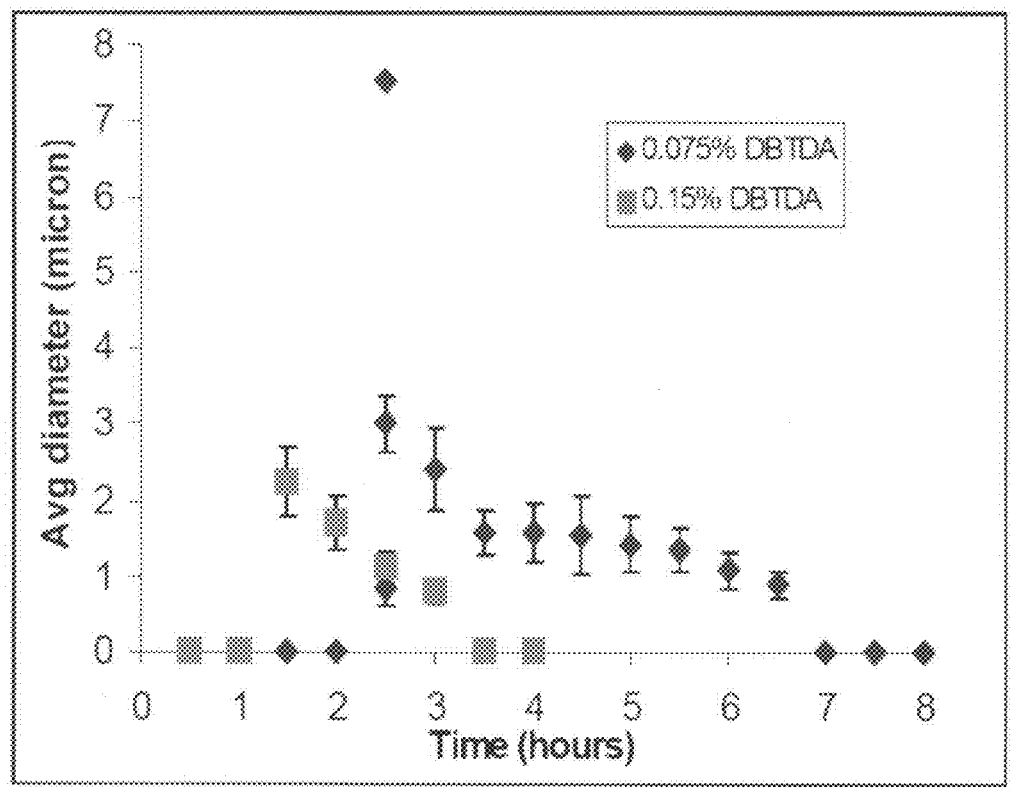
FIG. 13 is a plot of domain size versus time for the polymeric materials formed in Series A and Series B from FIG. 12.

Since the rate of the reaction between isocyanate and hydroxyl groups increases with an increase in catalyst level, domain formation was expected to appear earlier for the formulation with double the amount of catalyst. In Series B, coatings with double catalyst, domains of uniform size occurs after 1.5 hours of mixing (b3), which was exactly equal to half of the time that required in Series A. Similarly, domains started to decrease in size after 2.5 hours of mixing (b5) compared to five hours of mixing in Series A (a10) and disappeared completely after 3.5 hours of mixing (b7) as compared to 7 hours (a14) in Series A. The plots of domain size vs. time with 0.075% and 0.15% DBTDA catalyst are shown in FIG. 13. Since there was a wide size distribution in the Series A Sample at 2.5 hours, three data points are plotted, one for each major domain size observed.

From the results it can be seen that Series A and B formulations should be subjected to a minimum mixing time in order for domains to form on the surface of the coating. The results further indicate that some reaction is occurring between the oligomeric species prior to coating and film formation in order for surface domains to form. For the Series A coatings, there is also an interesting "window" between 3.5 and 5.5 hours where the domain size is relatively constant. Eventually, the domain size decreases and finally surface domains disappear indicating that further reaction results in a more homogeneous system where surface phase separation does not occur. The occurrence of similar stages of domain formation within a shorter period of time when double amount of catalyst was used shows that both the formation and size of the domains can be controlled kinetically.

Figure 14:
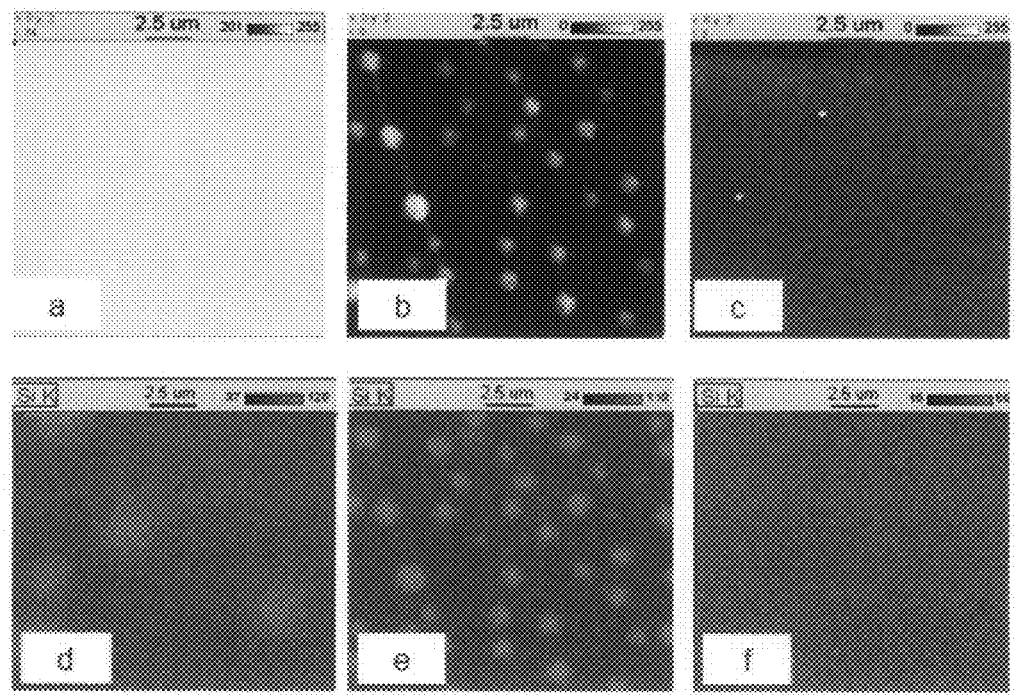
FIG. 14 shows scanning electron microscope images at (a) 0.5 hrs, (b) 3.5 hrs, and (c) 7.5 hrs and corresponding silicon mapping images for the polymeric materials from Series A in FIG. 12.

SEM imaging of the surfaces was used to further verify the generation of the microstructured polymer surface. SEM images of the surfaces after 0.5, 3.5, and 7.5 hours of mixing (a1, a7, a15 of series A from FIG. 12) showed the absence of microstructured domains at 0.5 and 7.5 hours, but presence of domains at 3.5 hours (FIG. 14a-c). The corresponding energy dispersive X-ray mapping of silicon indicated that the domains were rich in silicon as shown in FIG. 14e, however energy dispersive X-ray mapping of silicon revealed the existence of diffuse silicon-rich regions (FIG. 14d) when the time of mixing was 0.5 hour. Silicon was uniformly distributed over the surface (FIG. 14f) when mixing time was 7.5 hours. This SEM study with X-ray mapping revealed that in the initial stage of cross linking reaction PDMS was separated into some discrete regions and as the reaction progressed, silicon rich microdomains were generated at the surface and finally formed a featureless surface where silicon was uniformly distributed.

Figure 15:
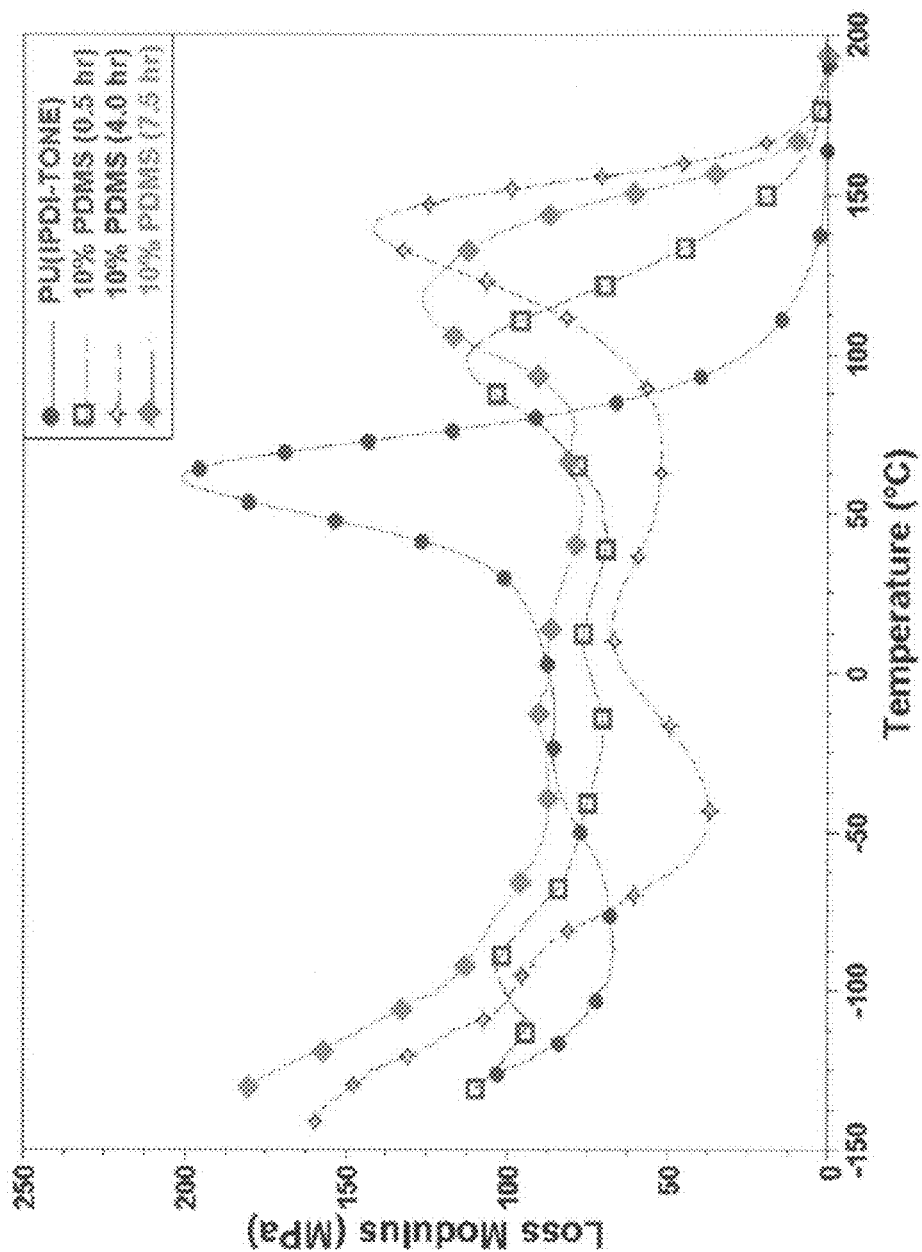
FIG. 15 is a plot of the loss modulus versus temperature as a function of mixing time for the polymeric material from Series A in FIG. 12.

In order to further understand the effect of the reaction kinetics on the morphology of the coatings, dynamic mechanical analysis (DMA) was performed on selected siloxane-urethane Samples with a control polyurethane containing no PDMS. Dynamic mechanical tests were carried out with a TA Instruments Q-800 DMA analyzer. Samples were run under tension from −140° C. to 200° C. at a heating rate of 2° C./min with 0.3% strain. Typically, siloxane-urethane systems are expected to show a transition around −128° C. to −90° C. due to well phase-separated PDMS segments. Although a low molecular weight PDMS (1000 g/mole) was used, in the early stages of mixing (0.5 hour), a transition associated with PDMS was observed at approximately −90° C. as shown in the loss modulus vs. temperature curve in FIG. 15. As the reaction progresses (4.5 hours), an intermediate phase appears centered around 5° C., while there is still a suggestion of a transition remaining at −90° C. While not wishing to be bound by theory, it appears that this intermediate phase, composed of both PDMS and polyurethane results in the phase separated surface structures observed. In later stages of mixing, however, the low temperature and intermediate phases disappear, the upper transition broadens, indicating that the system has become homogeneous. Thus, at the later stages, no domain formation is observed.

Example 5

In this example, the effect of the wt. % of PDMS on the formation of surface domains was determined by introducing 5 wt. %, 8 wt. %, 12 wt. % and 15 wt. % PDMS in the formulations on a solid resin basis. The polymeric material formulations shown as Samples 10-17 in Table 8 were prepared according to the procedure described in Example 1. The effects of the solvent composition and mixing time were evaluated by using two different solvent compositions for each wt. % PDMS and by applying the coatings after 3, 4, and 5 hours of mixing.

TABLE 8

| | PDMS | | PCL | Polyisocyanate | | Solvents | | Average domain size (microns) | | |
|---|---|---|---|---|---|---|---|---|---|---|
| Sample | Type | wt % | triol wt. % | Type | wt. % | Type/Ratio | | 3 hr | 4 hr | 5 hr |
| 10 | A | 5 | 29.51 | D | 65.49 | EEP:MAK:BuAc 40:12:48 | | 2.05 | 1.75 | 1.33 |
| 11 | A | 5 | 29.51 | D | 65.49 | EEP:MAK:BuAc 30:15:55 | | 1.57 | 1.31 | 1.03 |
| 12 | A | 8 | 27.81 | D | 64.19 | EEP:MAK:BuAc 44:12:44 | | 2.27 | 1.64 | 1.55 |
| 13 | A | 8 | 27.81 | D | 64.19 | EEP:MALK:BuAc 39:13:48 | | 2.09 | 1.59 | 1.57 |
| 14 | A | 12 | 25.54 | D | 62.46 | EEP:MAK:BuAc 42:13:45 | | 0.00 | 4.35 (irregular size) | 1.48 |
| 15 | A | 12 | 25.54 | D | 62.46 | EEP:MAK:BuAc 46:12:42 | | 0.00 | 0.00 | Irregular size |
| 16 | A | 15 | 23.84 | D | 61.16 | EEP:MAK:BuAc 42:13:45 | | 0.00 | 0.00 | 0.00 |
| 17 | A | 15 | 23.84 | D | 61.16 | EEP:MAK:BuAc 52:11:37 | | 0.00 | 0.00 | 0.00 |

* Wt. percent of catalyst is given with respect to total solid weight of polymeric material.

The results for Samples 10-17 are shown in Table 8. Those formulations having a higher amount of BuAc and lower amount of EEP formed smaller domains than those formulations that had a higher amount of EEP and lower amount of BuAc. With regard to the 12 wt. % formulations, Sample 14, which used a faster evaporating solvent composition, began to form domains after 4 hours of mixing, while Sample 15, which used a slower evaporating solvent composition, began to form domains after 5 hours of mixing. It should be noted that domains were not formed with the 15 wt. % PDMS formulations even after 18 hours of mixing before draw down.

Example 6

In this example, the effect of the curing conditions on formation of domains was determined. The formulation of the resin in all of the samples prepared in this example was 10 wt % PDMS A, 26.67 wt % PCL triol, and 63.33 wt % polyisocyanate D. Three different sets of curing conditions were tested. The three sets of curing conditions are: (1) mix ingredients for 4 hours, apply mixture to A1 panel and immediately place mixture in oven set at 80° C. for 45 minutes, (2) mix ingredients for 4 hours, apply mixture to A1 panel and let sit at room temperature for one hour, place panel in oven set at 80° C. for 45 minutes, and (3) mix ingredients for 4 hours, apply mixture to A1 panel and let sit at room temperature overnight, place panel in oven set at 80° C. for 45 minutes. The polymeric material cured under the first set of curing conditions formed microdomains having an average diameter of about 0.927 microns. The polymeric material cured under the second and third set of curing conditions formed microdomains having an average diameter of about 1.35 to 1.5 microns.

Illustrative Embodiments

Reference is made in the following to a number of illustrative embodiments of the subject matter described herein. The following embodiments illustrate only a few selected embodiments that may include the various features, characteristics, and advantages of the subject matter as presently described. Accordingly, the following embodiments should not be considered as being comprehensive of all of the possible embodiments.

According to one embodiment, a cross linked polymeric material prepared by reacting a composition comprising: polyol; polyisocyanate; and polyorganosiloxane having functional groups capable of reacting with the polyisocyanate; wherein the polymeric material has a surface which includes raised microdomains. The microdomains may not appreciably change when exposed to water for more than 14 days. The polyorganosiloxane may comprise hydroxy functional polyorganosiloxane. The polyorganosiloxane may comprise hydroxy functional polydimethylsiloxane. The polyol may have at least three hydroxy groups. The polyol may comprise polycaprolactone polyol. The polycaprolactone polyol may have at least three hydroxy groups. The polyisocyanate may have at least three isocyanate groups. The polyisocyanate may comprise isophorone based polyisocyanate.

According to another embodiment, a polymeric material prepared by reacting a composition comprising: polycaprolactone polyol; polyisocyanate; and polyorganosiloxane having functional groups capable of reacting with the polyisocyanate; wherein the polycaprolactone polyol includes polyol having at least three hydroxy groups and/or the polyisocyanate includes isocyanate having at least three isocyanate groups. The polymeric material may have a surface which includes microdomains. The microdomains may not appreciably change dimensionally when exposed to water for 14 days. The microdomains may have an average diameter of about 0.5 micron to 5 microns. The microdomains may have an average height of about 0.01 microns to 0.2 microns. The microdomains may have an average spacing of about 0.5 microns to 10 microns. The composition may comprises polycaprolactone polyol having at least three hydroxy groups; and polyisocyanate having at least three isocyanate groups. The polyorganosiloxane may comprise hydroxy functional polyorganosiloxane. The polyorganosiloxane may have an average hydroxyl equivalent weight of about 200 to 800, and desirably about 350 to 700. The polyorganosiloxane may comprise α,ω-bis[3-(2'-hydroxyethoxy)propyl]polydimethylsiloxane. The polyorganosiloxane may comprise hydroxy functional polydimethylsiloxane. The polyorganosiloxane may comprise hydroxy alkyl functional polydimethylsiloxane. The polyorganosiloxane may comprise amino functional polyorganosiloxane. The polyorganosiloxane may comprise amino alkyl functional polyorganosiloxane. The polymeric material may comprise about 10 wt % to 40 wt % polycaprolactone polyol. The polymeric material may comprise about 30 wt % to 85 wt % of polyisocyanate. The polyisocyanate may have an average isocyanate equivalent weight of about 150 to 600, and desirably about 250 to 450. The polymeric material may comprise: about 20 to 30 wt % polycaprolactone polyol which includes polyol having at least three hydroxy groups; about 50 to 75 wt % polyisocyanate, which includes isocyanate having at least three isocyanate groups; and about 3 to 13 wt % hydroxy functional polydimethylsiloxane. The polycaprolactone polyol may comprise polycaprolactone triol having an average hydroxyl equivalent weight of about 150 to 200; the polyisocyanate may comprise isophorone diisocyanate based polyisocyanate having an average isocyanate equivalent weight of about 250 to 450; and the hydroxy functional polydimethylsiloxane may comprise α,ω-bis[3-(2'-hydroxyethoxy)propyl]polydimethylsiloxane having an average hydroxyl equivalent weight of about 350 to 700. The polymeric material may comprise: about 10 to 40 wt % of the polycaprolactone polyol; about 30 to 85 wt % of the polyisocyanate; and about 2 to 14 wt % of the polyorganosiloxane.

According to another embodiment, a cross linked polymeric material prepared by reacting precursors comprising: less than 15 wt %, based on the total solids content of the polymeric material, of polyhydroxy functional polyorganosiloxane; polyol; and polyisocyanate.

According to another embodiment, a cross linked polymeric material prepared by reacting a composition comprising: polyol; polyisocyanate; polyorganosiloxane having functional groups capable of reacting with the polyisocyanate; and wherein the polymeric material includes surface microdomains which are more hydrophobic than a surrounding matrix. The microdomains may have a hydrophobicity which does not appreciably change when exposed to water for 14 days. The microdomains may have a morphology which does not appreciably change when exposed to water for 14 days.

According to another embodiment, a coating composition comprises: less than 15 wt %, based on the total solids in the coating composition after the coating composition has cured, of a hydroxy functional polyorganosiloxane; polycaprolactone polyol; polyisocyanate; and a solvent component. The solvent component may include alkyl alkoxypropionate, dialkyl ketone and/or alkyl acetate. The solvent component may include lower alkyl alkoxypropionate; dialkyl ketone having 4 to 10 carbon atoms; and/or lower alkyl acetate. The solvent component may include at least one of ethyl 3-ethoxypropionate, methyl n-amyl ketone, and butyl acetate. The coating composition may comprise a pot life extender. The pot life extender may include at least one of alkane-2,4-dione, N,N-dialkyl acetoacetamide, or alkyl acetoacetate. The pot life extender may comprise 2,4-pentanedione. The coating composition may comprise an isocyanate reaction catalyst. The isocyanate reaction catalyst may comprise dialkyl tin dicarboxylate, trialkytin hydroxide, dialkytin oxide, dialkyltin dialkoxide, dialkyltin dihalide or a mixture thereof. The isocyanate reaction catalyst may comprise diethyl tin diacetate, dibutyltin diacetate, dibutyltin dilaurate, dibutyltin maleate, dilauryltin diacetate, dioctyltin diacetate, or a mixture thereof. The isocyanate reaction catalyst may comprise a tin catalyst.

According to another embodiment, a substrate may comprise a surface coated with the polymeric materials from any of the embodiments described herein.

According to another embodiment, a method of preparing and using a coating composition comprises: adding isocyanate reaction catalyst to a composition comprising polyol, polyisocyanate, and polyorganosiloxane having functional groups capable of reacting with the polyisocyanate to form the coating composition; applying the coating composition to a substrate surface. The coating composition may cure to form a polymeric coating on the substrate surface having raised microdomains. The solvent component may have a vapor pressure no more than about 12 mm of Hg. The solvent component may have a vapor pressure no more than about 11 mm of Hg. The solvent component may have a vapor pressure of about 3 mm of Hg to 12 mm of Hg. The solvent component may have a solubility parameter between about 8 $(cal/cm^3)^{0.5}$ and 8.62 $(cal/cm^3)^{0.5}$. The ratio of alkyl alkoxypropionate to dialkyl ketone may be between about 45:5 and 5:45.

According to another embodiment, a cross linked polymeric material may be prepared by reacting a composition comprising: polyol; polyisocyanate; polyorganosiloxane having functional groups capable of reacting with the polyisocyanate; and a solvent component that includes an alkyl alkoxypropionate, dialkyl ketone, and/or alkyl acetate; wherein the polymeric material has a surface which includes raised microdomains.

As used herein, spatial or directional terms, such as "left," "right," "front," "back," and the like, relate to the subject matter as it is shown in the drawing Figures. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive, that is "or" when it appears alone shall mean both "and" and "or." Likewise, as used herein, the term "and/or" shall also be interpreted to be inclusive in that the term shall mean both "and" and "or." In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. A cross-linked polymeric material prepared by reacting a composition comprising:
 a solvent component; and
 polymer reactants comprising:
  polyol;
  polyisocyanate; and
  hydroxy functional polyorganosiloxane;

wherein the solvent component comprises a solvent combination selected from one of the following combinations:
  (a) butyl acetate, methyl n-amyl ketone and ethyl 3-ethoxypropionate;
  (b) butyl acetate, methyl n-amyl ketone, ethyl 3-ethoxypropionate and toluene;
  (c) butyl acetate, methyl n-amyl ketone, ethyl 3-ethoxypropionate and isopropanol;
  (d) butyl acetate, methyl n-amyl ketone, ethyl 3-ethoxypropionate, toluene and isopropanol;
  (e) butyl acetate and methyl n-amyl ketone;
  (f) butyl acetate, methyl n-amyl ketone and toluene;
  (g) butyl acetate, methyl n-amyl ketone, toluene and isopropanol;
  (h) butyl acetate and ethyl 3-ethoxypropionate;
  (i) butyl acetate, ethyl 3-ethoxypropionate and toluene;
  (j) butyl acetate, ethyl 3-ethoxypropionate and isopropanol; and
  (k) butyl acetate, ethyl 3-ethoxypropionate, toluene and isopropanol; and
wherein the cross-linked polymeric material has a surface including raised microdomains and a surrounding polymer matrix, wherein the raised microdomains are more hydrophobic than the surrounding polymer matrix and the average diameter of the raised microdomains is about 0.1 micron to 5 microns; and
the composition includes about 5 to 12 wt %, based on the total solids content of the cross-linked polymeric material, of the hydroxy functional polyorganosiloxane.

2. The cross-linked polymeric material of claim 1 wherein the surface of the cross-linked polymeric material retains the raised microdomains after being exposed to water for 14 days.

3. The cross-linked polymeric material of claim 1 wherein the hydroxy functional polyorganosiloxane comprises hydroxy functional polydimethylsiloxane.

4. The cross-linked polymeric material of claim 3 wherein the hydroxy functional polyorganosiloxane has an average hydroxyl equivalent weight of about 200 to 800.

5. The cross-linked polymeric material of claim 1 wherein the polyol comprises polyol having at least three hydroxy groups.

6. The cross-linked polymeric material of claim 1 wherein the polyol comprises polycaprolactone polyol.

7. The cross-linked polymeric material of claim 1 wherein the polyisocyanate comprises polyisocyanate having at least three isocyanate groups.

8. The cross-linked polymeric material of claim 1 wherein the raised microdomains have an average height of about 0.01 microns to 0.2 micron.

9. The cross-linked polymeric material of claim 1 wherein the raised microdomains have an average spacing of about 0.5 microns to 10 microns.

10. The cross-linked polymeric material of claim 1 wherein the composition further comprises a pot life extender, which includes 24-pentanedione.

11. The cross-linked polymeric material of claim 1 wherein the surface has a microdomain density of about 0.1 to 1.5 microdomains/micron$^2$.

12. A cross-linked polymeric material prepared by reacting a composition comprising:
  a solvent component; and
  polymer reactants comprising:
    polycaprolactone polyol;
    polyisocyanate; and
    hydroxy functional polyorganosiloxane;

wherein the polycaprolactone polyol includes polyol having at least three hydroxy groups and the polyisocyanate includes isocyanate having at least three isocyanate groups;
the solvent component comprises a solvent combination selected from one of the following combinations:
  (a) butyl acetate, methyl n-amyl ketone and ethyl 3-ethoxypropionate;
  (b) butyl acetate, methyl n-amyl ketone, ethyl 3-ethoxypropionate and toluene;
  (c) butyl acetate, methyl n-amyl ketone, ethyl 3-ethoxypropionate and isopropanol;
  (d) butyl acetate, methyl n-amyl ketone, ethyl 3-ethoxypropionate, toluene and isopropanol;
  (e) butyl acetate and methyl n-amyl ketone;
  (f) butyl acetate, methyl n-amyl ketone and toluene;
  (g) butyl acetate, methyl n-amyl ketone, toluene and isopropanol;
  (h) butyl acetate and ethyl 3-ethoxypropionate;
  (i) butyl acetate, ethyl 3-ethoxypropionate and toluene;
  (j) butyl acetate, ethyl 3-ethoxypropionate and isopropanol; and
  (k) butyl acetate, ethyl 3-ethoxypropionate, toluene and isopropanol; and
the cross-linked polymeric material has a surface including raised microdomains and a surrounding polymer matrix;
wherein the average diameter of the raised microdomains is about 0.1 micron to 5 microns and being the raised microdomains are more hydrophobic than the surrounding polymer matrix; and
the composition includes about 5 to 12 wt %, based on the total solids content of the cross-linked polymeric material, of the hydroxy functional polyorganosiloxane.

13. The cross-linked polymeric material of claim 12 comprising about 10 wt % to 40 wt % polycaprolactone polyol.

14. The cross-linked polymeric material of claim 12 comprising about 30 wt % to 85 wt % of polyisocyanate.

15. The cross-linked polymeric material of claim 12 wherein the polyisocyanate has an average isocyanate equivalent weight of about 150 to 600.

16. The cross-linked polymeric material of claim 12 comprising:
  about 20 to 30 wt % of the polycaprolactone polyol which includes polyol having at least three hydroxy groups;
  about 50 to 75 wt % of the polyisocyanate, which includes isocyanate having at least three isocyanate groups; and
  about 5 to 12 wt % hydroxy functional polydimethylsiloxane.

17. The cross-linked polymeric material of claim 12 wherein the polycaprolactone polyol comprises polycaprolactone triol having an average hydroxyl equivalent weight of about 150 to 200;
  the polyisocyanate comprises isophorone diisocyanate based polyisocyanate having an average isocyanate equivalent weight of about 250 to 450; and
  the hydroxy functional polyorganosiloxane comprises α,ω-bis(3-(2'-hydroxyethoxy)propyl)-polydimethylsiloxane having an average hydroxyl equivalent weight of about 350 to 700.

18. The cross-linked polymeric material of claim 12, wherein the composition comprises on a solids basis:
  about 10 to 40 wt % of the polycaprolactone polyol; and
  about 30 to 85 wt % of the polyisocyanate; and
  about 5 to 12 wt % hydroxy functional polydimethylsiloxane.

19. The cross-linked polymeric material of claim 12 wherein the surface of the cross-linked polymeric material retains the raised microdomains after being exposed to water for 14 days.

20. A substrate comprising a surface coated with the cross-linked polymeric material of claim 1.

21. The cross-linked polymeric material of claim 1 wherein the raised microdomains are polyorganosiloxane rich microdomains and the surrounding polymer matrix is a polyurethane rich matrix.

22. The cross-linked polymeric material of claim 12 wherein the raised microdomains are polyorganosiloxane rich microdomains and the surrounding polymer matrix is a polyurethane rich matrix.

23. The cross-linked polymeric material of claim 12 wherein the raised microdomains have an average height of about 0.01 to 0.2 microns.

24. The cross-linked polymeric material of claim 1 wherein the hydroxy functional polyorganosiloxane comprises polyhydroxy functional polyorganosiloxane.

25. A cross-linked polymeric material prepared by reacting a composition comprising:
 a solvent component; and
 polymer reactants comprising:
  polyol;
  polyisocyanate; and
  hydroxy functional polyorganosiloxane;
 wherein the cross-linked polymeric material has a surface including raised microdomains and a surrounding polymer matrix; the raised microdomains are more hydrophobic than the surrounding polymer matrix; and the microdomain density of the surface is about 0.1 to 1.5 microdomains/micron;
 the composition includes about 5 to 12 wt %, based on the total solids content of the cross-linked polymeric material, of the hydroxy functional polyorganosiloxane; and
 the solvent component comprises a solvent combination selected from one of the following combinations:
  (a) butyl acetate, methyl n-amyl ketone and ethyl 3-ethoxypropionate;
  (b) butyl acetate, methyl n-amyl ketone, ethyl 3-ethoxypropionate and toluene;
  (c) butyl acetate, methyl n-amyl ketone, ethyl 3-ethoxypropionate and isopropanol;
  (d) butyl acetate, methyl n-amyl ketone, ethyl 3-ethoxypropionate, toluene and isopropanol;
  (e) butyl acetate and methyl n-amyl ketone;
  (f) butyl acetate, methyl n-amyl ketone and toluene;
  (g) butyl acetate, methyl n-amyl ketone, toluene and isopropanol;
  (h) butyl acetate and ethyl 3-ethoxypropionate;
  (i) butyl acetate, ethyl 3-ethoxypropionate and toluene;
  (j) butyl acetate, ethyl 3-ethoxypropionate and isopropanol; and
  (k) butyl acetate, ethyl 3-ethoxypropionate, toluene and isopropanol.

26. The cross-linked polymeric material of claim 25 wherein the hydroxy functional polyorganosiloxane comprises polyhydroxy functional polyorganosiloxane.

27. The cross-linked polymeric material of claim 25 wherein the raised microdomains are polyorganosiloxane rich microdomains and the surrounding polymer matrix is a polyurethane rich matrix.

28. The cross-linked polymeric material of claim 27 wherein the raised microdomains have an average diameter of about 0.1 micron to 5 microns.

29. The cross-linked polymeric material of claim 25 wherein the raised microdomains have an average height of about 0.01 microns to 0.2 microns.

30. The cross-linked polymeric material of claim 25 wherein the raised microdomains have an average spacing of about 0.5 microns to 10 microns.

31. The cross-linked polymeric material of claim 25, wherein the surface of the cross-linked polymeric material retains the raised microdomains after being exposed to water for 14 days.

32. The cross-linked polymeric material of claim 25, wherein the raised microdomains have an average diameter of about 0.1 micron to 5 microns; the surface of the cross-linked polymeric material retains the raised microdomains after being exposed to water for 14 days; and the polyol comprises polyol having at least three hydroxy groups and/or the polyisocyanate comprises polyisocyanate having at least three isocyanate groups.

33. The cross-linked polymeric material of claim 32, wherein the hydroxy functional polyorganosiloxane comprises polyhydroxy functional polyorganosiloxane.

34. The cross-linked polymeric material of claim 1, wherein the hydroxy functional polyorganosiloxane comprises polyhydroxy functional polyorganosiloxane; the polyisocyanate comprises isophorone based polyisocyanate; and the polyol comprises polycaprolactone polyol.

35. The cross-linked polymeric material of claim 1, wherein the hydroxy functional polyorganosiloxane comprises hydroxy alkyl functional polydimethylsiloxane; the polyisocyanate comprises isophorone-based polyisocyanate having at least three isocyanate groups; and the polyol comprises polycaprolactone polyol having at least three hydroxy groups.

* * * * *

UNITED STATES PATENT AND TRADEMARK OFFICE
CERTIFICATE OF CORRECTION

| | | |
|---|---|---|
| PATENT NO. | : 8,062,729 B2 | Page 1 of 1 |
| APPLICATION NO. | : 11/827446 | |
| DATED | : November 22, 2011 | |
| INVENTOR(S) | : Dean C. Webster et al. | |

It is certified that error appears in the above-identified patent and that said Letters Patent is hereby corrected as shown below:

<u>Claim 10, col. 19, line 57</u>

Delete "24" and replace with -- 2,4 --

<u>Claim 12, col. 20, line 28</u>

Delete "being"

Signed and Sealed this
Thirteenth Day of March, 2012

David J. Kappos
*Director of the United States Patent and Trademark Office*